United States Patent
Jung et al.

(10) Patent No.: US 10,693,800 B2
(45) Date of Patent: Jun. 23, 2020

(54) TCP PROXY DEVICE-ASSISTED COMMUNICATION METHOD AND APPARATUS IN WIRELESS COMMUNICATION

(71) Applicant: Samsung Electronics Co., Ltd., Suwon-si, Gyeonggi-do (KR)

(72) Inventors: Hakyung Jung, Suwon-si (KR); Junghwan Lim, Hwaseong-si (KR); Youngsuk Sun, Suwon-si (KR); Jinhyoung Kim, Seongnam-si (KR); Jaehyun Hwang, Anyang-si (KR); Hyunjoo Lee, Seoul (KR); Sooyoung Jang, Suwon-si (KR); Giwon Lee, Seoul (KR); Jinho Lee, Seoul (KR)

(73) Assignee: Samsung Electronics Co., Ltd., Suwon-si (KR)

( * ) Notice: Subject to any disclaimer, the term of this patent is extended or adjusted under 35 U.S.C. 154(b) by 0 days.

(21) Appl. No.: 15/982,695

(22) Filed: May 17, 2018

(65) Prior Publication Data
US 2018/0337866 A1    Nov. 22, 2018

(30) Foreign Application Priority Data

May 17, 2017  (KR) .................. 10-2017-0061217
Jun. 16, 2017  (KR) .................. 10-2017-0076888

(51) Int. Cl.
*H04L 12/801*    (2013.01)
*H04L 12/26*    (2006.01)
(Continued)

(52) U.S. Cl.
CPC .......... *H04L 47/34* (2013.01); *H04L 43/0829* (2013.01); *H04L 43/0864* (2013.01);
(Continued)

(58) Field of Classification Search
CPC ..... H04L 12/26; H04L 12/801; H04L 12/841; H04L 29/08; H04L 43/0829;
(Continued)

(56) References Cited

U.S. PATENT DOCUMENTS 7,085,829 B2 *  8/2006  Wu ................... H04L 29/06
                                        370/351
7,239,608 B2 *  7/2007  Sreejith .............. H04L 45/00
                                        370/230
(Continued)

FOREIGN PATENT DOCUMENTS

WO       2016089082 A1    6/2016

OTHER PUBLICATIONS

ISA/KR, International Search Report for International Application No. PCT/KR2018/005685, dated Aug. 27, 2018, 3 pages.
(Continued)

*Primary Examiner* — Tri H Phan

(57) ABSTRACT

The present disclosure relates to a communication method and system for converging a 5th-Generation (5G) communication system for supporting higher data rates beyond a 4th-Generation (4G) system with a technology for Internet of Things (IoT). The present disclosure may be applied to intelligent services based on the 5G communication technology and the IoT-related technology, such as smart home, smart building, smart city, smart car, connected car, health care, digital education, smart retail, security and safety services. A method of a proxy device in a communication system of the present disclosure includes identifying a packet loss rate on a wireless connection between a terminal and a server, determining whether the packet loss rate is greater than a predetermined threshold value, and proxying, if the packet loss rate is greater than the threshold value, the connection between the terminal and the server.

20 Claims, 20 Drawing Sheets

(51) Int. Cl.
*H04W 24/08* (2009.01)
*H04W 28/04* (2009.01)
*H04W 36/08* (2009.01)
*H04W 36/38* (2009.01)
*H04W 36/16* (2009.01)
*H04W 36/30* (2009.01)

(52) U.S. Cl.
CPC ............. *H04L 43/16* (2013.01); *H04W 24/08* (2013.01); *H04W 28/04* (2013.01); *H04W 36/08* (2013.01); *H04W 36/165* (2013.01); *H04W 36/30* (2013.01); *H04W 36/38* (2013.01)

(58) Field of Classification Search
CPC ..... H04L 43/0864; H04L 43/16; H04L 47/34; H04L 29/08702; H04L 41/00; H04L 43/00; H04L 47/122; H04L 43/0817; H04W 24/08; H04W 28/04; H04W 36/08; H04W 36/30; H04W 36/38; H04W 36/165; H04W 84/12; H04W 4/50–70; H04W 24/00–08; H04W 28/0236; H04W 28/0242; H04W 28/0247; H04W 28/16; H04W 40/12; H04W 52/26; H04W 52/262; H04W 52/265; H04W 52/267; H04W 72/085; H04W 72/1226; H04W 72/1231; H04W 80/00; H04W 80/04; H04W 36/00; H04W 36/0058; H04W 36/0085; H04W 36/24; H04W 36/305; H04W 48/02; H04W 48/17; H04W 48/20; H04B 17/309; H04B 17/318
See application file for complete search history.

(56) References Cited

U.S. PATENT DOCUMENTS

| | | | | |
|---|---|---|---|---|
| 7,394,788 | B2* | 7/2008 | Kim | H04W 80/00 |
| | | | | 370/328 |
| 9,641,650 | B2* | 5/2017 | Virkki | H04L 69/16 |
| 9,973,600 | B2* | 5/2018 | Good | H04L 69/22 |
| 10,299,181 | B2* | 5/2019 | Lim | H04W 36/02 |
| 10,305,807 | B2* | 5/2019 | Dhanabalan | H04L 47/24 |
| 10,440,603 | B2* | 10/2019 | Nuss | H04W 28/08 |
| 2002/0191594 | A1 | 12/2002 | Itoh et al. | |
| 2005/0141455 | A1* | 6/2005 | Kim | H04W 80/00 |
| | | | | 370/331 |
| 2009/0109849 | A1 | 4/2009 | Wood et al. | |
| 2010/0316066 | A1 | 12/2010 | Leung | |
| 2012/0300663 | A1 | 11/2012 | Lu et al. | |
| 2013/0058212 | A1 | 3/2013 | Noy et al. | |
| 2013/0083799 | A1 | 4/2013 | Xie et al. | |
| 2014/0036674 | A1 | 2/2014 | Agrawal et al. | |
| 2017/0273126 | A1 | 9/2017 | Lim et al. | |

OTHER PUBLICATIONS

Supplementary European Search Report in connection with European Application No. 18801919.4 dated Jan. 23, 2020, 8 pages.
Liu, Chien-Ping, "Adaptive Splitting TCP for Wireless Sensor Networks," International Journal of Engineering and Industries, vol. 2, No. 2, Jun. 2011, 7 pages.
Meyer, Michael, et al, "Performance Evaluation of a TCP Proxy in WCDMA Networks," IEEE Personal Communications, IEEE Communications Society, vol. 10 No. 5, Oct. 2, 2003, 10 pages.

* cited by examiner

TCP PROXY DEVICE-ASSISTED COMMUNICATION METHOD AND APPARATUS IN WIRELESS COMMUNICATION

CROSS-REFERENCE TO RELATED APPLICATIONS AND CLAIM OF PRIORITY

This application is based on and claims priority under 35 U.S.C. § 119(a) of a Korean patent application number 10-2017-0061217, filed on May 17, 2017, and a Korean patent application number 10-2017-0076888, filed on Jun. 16, 2017 in the Korean Intellectual Property Office, the disclosure of which is incorporated by reference herein in its entirety.

BACKGROUND

1. Field

The present disclosure relates to a communication system and, in particular, to a transmission control protocol (TCP) proxy device-assisted communication method and apparatus for use in the communication system.

2. Description of Related Art

To meet the demand for wireless data traffic having increased since deployment of 4G communication systems, efforts have been made to develop an improved 5G or pre-5G communication system. Therefore, the 5G or pre-5G communication system is also called a 'Beyond 4G Network' or a 'Post LTE System'. The 5G communication system is considered to be implemented in higher frequency (mmWave) bands, e.g., 60 GHz bands, so as to accomplish higher data rates. To decrease propagation loss of the radio waves and increase the transmission distance, the beamforming, massive multiple-input multiple-output (MIMO), Full Dimensional MIMO (FD-MIMO), array antenna, an analog beam forming, large scale antenna techniques are discussed in 5G communication systems. In addition, in 5G communication systems, development for system network improvement is under way based on advanced small cells, cloud Radio Access Networks (RANs), ultra-dense networks, device-to-device (D2D) communication, wireless backhaul, moving network, cooperative communication, Coordinated Multi-Points (CoMP), reception-end interference cancellation and the like. In the 5G system, Hybrid FSK and QAM Modulation (FQAM) and sliding window superposition coding (SWSC) as an advanced coding modulation (ACM), and filter bank multi carrier (FBMC), non-orthogonal multiple access (NOMA), and sparse code multiple access (SCMA) as an advanced access technology have been developed.

The Internet, which is a human centered connectivity network where humans generate and consume information, is now evolving to the Internet of Things (IoT) where distributed entities, such as things, exchange and process information without human intervention. The Internet of Everything (IoE), which is a combination of the IoT technology and the Big Data processing technology through connection with a cloud server, has emerged. As technology elements, such as "sensing technology", "wired/wireless communication and network infrastructure", "service interface technology", and "Security technology" have been demanded for IoT implementation, a sensor network, a Machine-to-Machine (M2M) communication, Machine Type Communication (MTC), and so forth have been recently researched. Such an IoT environment may provide intelligent Internet technology services that create a new value to human life by collecting and analyzing data generated among connected things. IoT may be applied to a variety of fields including smart home, smart building, smart city, smart car or connected cars, smart grid, health care, smart appliances and advanced medical services through convergence and combination between existing Information Technology (IT) and various industrial applications.

In line with this, various attempts have been made to apply 5G communication systems to IoT networks. For example, technologies such as a sensor network, Machine Type Communication (MTC), and Machine-to-Machine (M2M) communication may be implemented by beamforming, MIMO, and array antennas. Application of a cloud Radio Access Network (RAN) as the above-described Big Data processing technology may also be considered to be as an example of convergence between the 5G technology and the IoT technology.

Meanwhile, a TCP connection between a terminal and a server for use of Internet services may be split, by a split connection proxy (hereinafter, interchangeably referred to as "proxy" and "proxy device"), into two parts: one connection between the server and a proxy device and the other between the proxy device and the terminal.

In the case of using such a proxy, however, the end-to-end delay of the TCP connection between the server and the terminal is likely to increase; if a high specification device is employed to mitigate the delay, this may contribute to cost increases.

In order to solve the above problem, it may be considered to use a technique called TCP splicing that is capable of maximizing performance by establishing two connections, i.e., connection between the server and the proxy and connection between the proxy and the terminal, without passing through the application layer of a user space. In the case of using TCP splicing, however, the performance gain expected by splitting the TCP connection may be reduced.

SUMMARY

The present disclosure has been conceived to solve the above problems and aims to improve the performance of a proxy system by performing a proxy operation dynamically depending on whether the TCP connection is established over a wireless local area network (WLAN).

Also, the present disclosure aims to improve the system performance by performing a proxy operation selectively according to signal quality of a wirelessly connected terminal.

In accordance with an aspect of the present disclosure, a method of a proxy device in a communication system is provided. The method includes determining a system load value related to the proxy device satisfies a predetermined condition, if the system load value satisfies the predetermined condition, identifying whether a connection between the proxy device and a terminal is a wireless connection, if the connection is the wireless connection, processing a received packet using a split connection, and if the connection is not the wireless connection, forwarding the received packet.

In accordance with an aspect of the present disclosure, a proxy device of a communication system is provided. The proxy device includes a transceiver and a controller configured to determine a system load value related to the proxy device satisfies a predetermined condition, if the system load value satisfies the predetermined condition, identify whether a connection between the proxy device and a terminal is a wireless connection, if the connection is the wireless connection, process a received packet using a split connection, and if the connection is not the wireless connection, forward the received packet.

In accordance with an aspect of the present disclosure, a method of a proxy device in a communication system is provided. The method includes identifying a packet loss rate on a wireless connection between a terminal and a server, determining whether the packet loss rate is greater than a predetermined threshold value, and proxying, if the packet loss rate is greater than the threshold value, the connection between the terminal and the server.

In accordance with another aspect of the present disclosure, a proxy device of a communication system is provided. The proxy device includes a transceiver and a controller configured to identify a packet loss rate on a wireless connection between a terminal and a server, determine whether the packet loss rate is greater than a predetermined threshold value, and perform, if the packet loss rate is greater than the threshold value, a proxy process on the connection between the terminal and the server.

Before undertaking the DETAILED DESCRIPTION below, it may be advantageous to set forth definitions of certain words and phrases used throughout this patent document: the terms "include" and "comprise," as well as derivatives thereof, mean inclusion without limitation; the term "or," is inclusive, meaning and/or; the phrases "associated with" and "associated therewith," as well as derivatives thereof, may mean to include, be included within, interconnect with, contain, be contained within, connect to or with, couple to or with, be communicable with, cooperate with, interleave, juxtapose, be proximate to, be bound to or with, have, have a property of, or the like; and the term "controller" means any device, system or part thereof that controls at least one operation, such a device may be implemented in hardware, firmware or software, or some combination of at least two of the same. It should be noted that the functionality associated with any particular controller may be centralized or distributed, whether locally or remotely.

Moreover, various functions described below can be implemented or supported by one or more computer programs, each of which is formed from computer readable program code and embodied in a computer readable medium. The terms "application" and "program" refer to one or more computer programs, software components, sets of instructions, procedures, functions, objects, classes, instances, related data, or a portion thereof adapted for implementation in a suitable computer readable program code. The phrase "computer readable program code" includes any type of computer code, including source code, object code, and executable code. The phrase "computer readable medium" includes any type of medium capable of being accessed by a computer, such as read only memory (ROM), random access memory (RAM), a hard disk drive, a compact disc (CD), a digital video disc (DVD), or any other type of memory. A "non-transitory" computer readable medium excludes wired, wireless, optical, or other communication links that transport transitory electrical or other signals. A non-transitory computer readable medium includes media where data can be permanently stored and media where data can be stored and later overwritten, such as a rewritable optical disc or an erasable memory device.

Definitions for certain words and phrases are provided throughout this patent document, those of ordinary skill in the art should understand that in many, if not most instances, such definitions apply to prior, as well as future uses of such defined words and phrases.

BRIEF DESCRIPTION OF THE DRAWINGS

For a more complete understanding of the present disclosure and its advantages, reference is now made to the following description taken in conjunction with the accompanying drawings, in which like reference numerals represent like parts.

DETAILED DESCRIPTION

Figure 1:
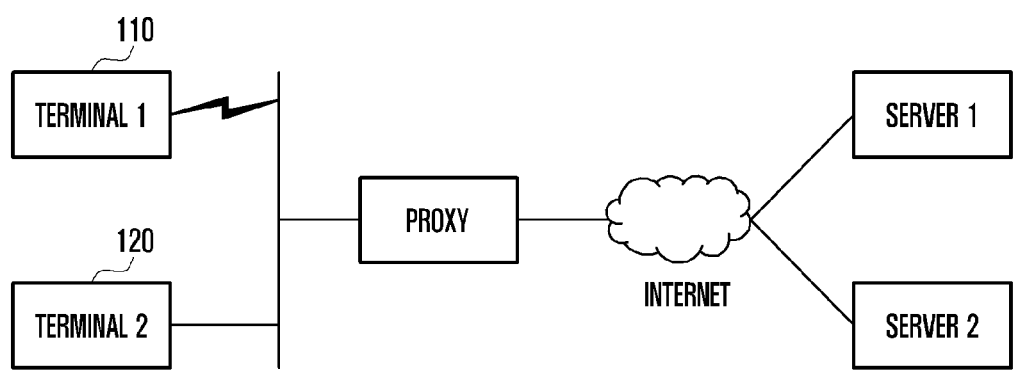
FIG. 1 illustrates a diagram of relationships between a proxy system and other devices according to an embodiment of the present disclosure.

FIGS. 1 through 18, discussed below, and the various embodiments used to describe the principles of the present disclosure in this patent document are by way of illustration only and should not be construed in any way to limit the scope of the disclosure. Those skilled in the art will understand that the principles of the present disclosure may be implemented in any suitably arranged system or device.

Exemplary embodiments of the present disclosure are described with reference to the accompanying drawings in detail.

Detailed descriptions of well-known functions and structures incorporated herein may be omitted to avoid obscuring the subject matter of the present disclosure. This aims to omit unnecessary description so as to make clear the subject matter of the present disclosure.

For the same reason, some elements are exaggerated, omitted, or simplified in the drawings and, in practice, the elements may have sizes and/or shapes different from those shown in the drawings. The same reference numbers are used throughout the drawings to refer to the same or like parts.

Advantages and features of the present disclosure and methods of accomplishing the same may be understood more readily by reference to the following detailed description of exemplary embodiments and the accompanying drawings. The present disclosure may, however, be embodied in many different forms and should not be construed as being limited to the exemplary embodiments set forth herein. Rather, these exemplary embodiments are provided so that this disclosure will be thorough and complete and will fully convey the concept of the disclosure to those skilled in the art, and the present disclosure will only be defined by the appended claims. Like reference numerals refer to like elements throughout the specification.

It will be understood that each block of the flowcharts and/or block diagrams, and combinations of blocks in the flowcharts and/or block diagrams, can be implemented by computer program instructions. These computer program instructions may be provided to a processor of a general-purpose computer, special purpose computer, or other programmable data processing apparatus, such that the instructions that are executed via the processor of the computer or other programmable data processing apparatus create means for implementing the functions/acts specified in the flowcharts and/or block diagrams. These computer program instructions may also be stored in a non-transitory computer-readable memory that can direct a computer or other programmable data processing apparatus to function in a particular manner, such that the instructions stored in the non-transitory computer-readable memory produce articles of manufacture embedding instruction means that implement the function/act specified in the flowcharts and/or block diagrams. The computer program instructions may also be loaded onto a computer or other programmable data processing apparatus to cause a series of operational steps to be performed on the computer or other programmable apparatus to produce a computer implemented process such that the instructions that are executed on the computer or other programmable apparatus provide steps for implementing the functions/acts specified in the flowcharts and/or block diagrams.

Furthermore, the respective block diagrams may illustrate parts of modules, segments, or codes including at least one or more executable instructions for performing specific logic function(s). Moreover, it should be noted that the functions of the blocks may be performed in a different order in several modifications. For example, two successive blocks may be performed substantially at the same time or may be performed in reverse order according to their functions.

According to various embodiments of the present disclosure, the term "module", means, but is not limited to, a software or hardware component, such as a Field Programmable Gate Array (FPGA) or Application Specific Integrated Circuit (ASIC), which performs certain tasks. A module may advantageously be configured to reside on the addressable storage medium and configured to be executed on one or more processors. Thus, a module may include, by way of example, components, such as software components, object-oriented software components, class components and task components, processes, functions, attributes, procedures, subroutines, segments of program code, drivers, firmware, microcode, circuitry, data, databases, data structures, tables, arrays, and variables. The functionality provided for in the components and modules may be combined into fewer components and modules or further separated into additional components and modules. In addition, the components and modules may be implemented such that they execute one or more CPUs in a device or a secure multimedia card.

Although depicted in a particular order in the drawing, two successive steps may be performed in reverse order or in parallel.

Although the description is directed to a wireless communication system for convenience of explanation, the present disclosure is applicable to wireline communication systems.

First Embodiment

As described above, a TCP connection between a server and a terminal for use of Internet services may be split, by a proxy, into two parts: one connection between the server and the proxy and the other between the proxy and the terminal. The proxy has various purposes such as hypertext transfer protocol (HTTP) cache, firewall, and encryption server and is useful especially for the TCP connection established using (or by way of) a wireless communication network such as WLAN. This is because a split connection proxy installed close to a gateway of a wireless network separates the packet loss caused by change of a radio channel in the wireless network from a congestion packet loss in the wireline network with the gain expected by preventing a TCP sender from decreasing a congestion window (cwnd) unnecessarily.

According to a proxy implementation, if a process running on a terminal attempts connection to a server, a terminal library intercepts and redirects the connection attempt to a proxy system. Then, the proxy system splits the logical connection between the server and the terminal into two parts.

In the course of performing the above process, the proxy suffers a performance problem. In order to transfer data from a server to a terminal, an application layer proxy process reads the data intended for the terminal from the connection between the proxy and the server and write the data into the connection between the proxy and the terminal. Since the cost used to cross a boundary between a user space and a kernel space of the operating system and reserve processes for moving data twice through a TCP/IP stack is expensive, the proxy may create a bottleneck effect in the system. This means that the proxy may cause a side effect of increasing end-to-end delay on the TCP connection between the server and the terminal, and employment of a high specification device used for mitigating the end-to-end delay may increase implementation costs of the proxy administrator.

As one of representative techniques for reducing overhead of the proxy systems as described above, TCP splicing is capable of maximizing the system performance by establishing the connection between the server and the proxy and the connection between the proxy and the terminal without passing through the application layer of a user space. That is, the TCP splicing makes it possible for the proxy to modify a header of the received packet and the packet is not delivered to the user space through the protocol stack, as if the proxy acts like a layer 3.5 router relaying data between the server and the terminal.

Such operations of the TCP splicing improve the performance of the proxy system and the TCP connection control is moved to the two endpoints, i.e., the server and terminal of the TCP connection, as if no proxy is involved therebetween. Although this technique gives gain depending on the usage goal of the proxy, if it is being used for TCP performance enhancement by separating the packet loss in a wireless communication network from a TCP congestion packet loss as aforementioned, it may cause significant loss.

In order to solve the above problems, the present disclosure proposes a method for improving the performance of a proxy system by performing a proxy operation selectively depending on whether a TCP connection uses a WLAN.

FIG. 1 illustrates a diagram of relationships between a proxy system and other devices according to an embodiment of the present disclosure.

The proxy system is located on a path between a terminal and a server and may listen on multiple paths established between multiple terminals and servers.

In reference to FIG. 1, the connection between terminal 1 110 and the proxy may be established by using (or via) a WLAN, and the connection between terminal 2 120 and the proxy may be established via a wireline local area network (LAN).

Figure 2:
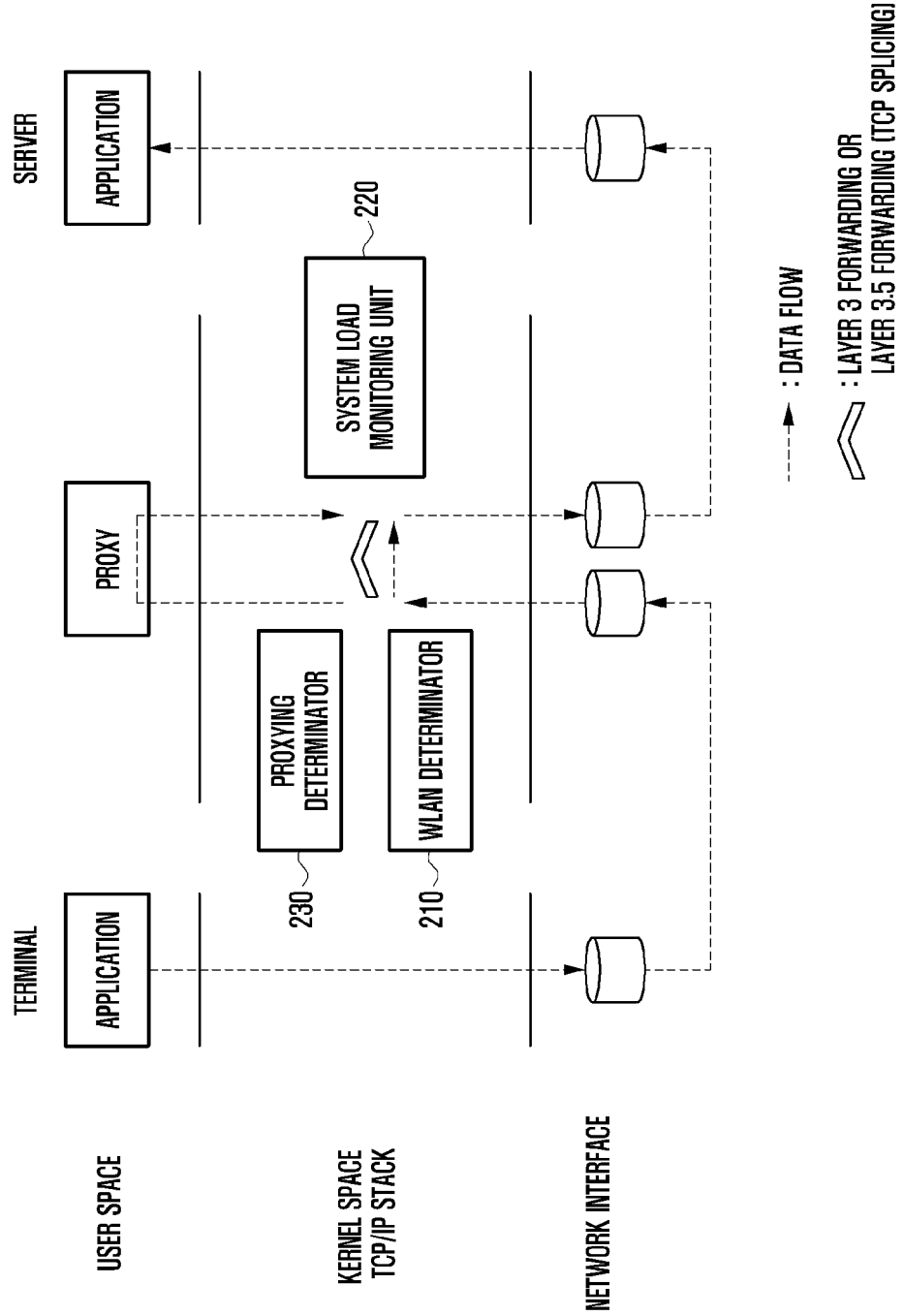
FIG. 2 illustrates a diagram of a configuration of a proxy system and connections between devices in the proxy system in view of protocol layers according to embodiments of the present disclosure.

FIG. 2 illustrates a diagram of a configuration of a proxy system and connections between devices in the proxy system in view of protocol layers according to embodiments of the present disclosure.

In the present disclosure, the proxy system may divide a connection between a server and a terminal into two parts: one connection between the server and the proxy and the other between the proxy and the terminal. A proxy process that runs in a user space of the proxy system reads data intended for the terminal from the server-proxy connection and writes the data into the proxy-terminal connection.

The proxy system is capable of protecting against unnecessary reduction of a congestion window on the server-proxy connection even when a packet loss occurs on the wireless connection between the terminal and the proxy system by splitting the connection between the server and the terminal into two parts: server-proxy connection and proxy-terminal connection. That is, it may be possible to separate the packet loss caused by change of the wireless channel (established between the terminal and the proxy) from congestion loss on the wireline network by using the proxy system, resulting in protection against unnecessary reduction of congestion window (cwnd). If there is any packet loss, retransmission may occur frequently because the round-trip time (RTT) on the proxy-terminal connection is less than the RTT on the connection between the terminal and the server.

The proxy system determines whether the proxy-terminal connection is established via a WLAN based on at least one of the RTT on the terminal-proxy connection that is measured when establishing the TCP connection, a variation of RTT value, and a previous retransmission occurrence rate at a physical port (network interface) of the connection. This operation is described later in detail.

A system load monitoring unit 220 of the proxy system may monitor the TCP connection established between the terminal and the server to measure the level of load in the course of mediating the TCP connection. The proxy system may be included in an indoor device (customer-provided equipment (CPE)) or located close to the CPE or at a separate place. If the proxy system is included in the CPE, the system load monitoring unit 220 may monitor the CPE for the load level. If the proxy system is located at a separate place, the system load monitoring unit 220 may monitor the proxy for load information.

A proxying determinator 230 of the proxy system may determine whether to split a connection established between a terminal and a server into a terminal-proxy connection and a proxy-server connection that are terminated by an application layer proxy process, to perform TCP splicing (L3.5 forwarding) for modifying the header of the incoming packet received and transmitting the header-modified packet in the TCP stack of the kernel space without any proxy process in the user space, or perform layer 3 forwarding for delivering the packet to the next network interface in the IP stack when mediating the TCP connection between the terminal and the server based on the information acquired by means of the WLAN determinator 210 and the system load monitoring unit 220.

In the present disclosure, the scheme of splitting the connection between the terminal and the server into two connections that are terminated at the application layer of the proxy is referred to as split connection mode, and the scheme of TCP splicing or layer 3 forwarding is referred to as forwarding mode. These operation modes are described later in detail.

In the present disclosure, the proxy system employs two operation methods.

The first operation method is characterized in that, if one of the proxy connection modes for TCP connection (split connection, layer 3.5 forwarding, and layer 3 forwarding) is determined, the proxy connection mode is not changed until the connection is released.

The second operation method is characterized by switching between the split connection mode and forwarding mode (layer 3 forwarding and layer 3.5 forwarding) depending on system load and whether the TCP connection is established via a WLAN. The operation methods are described later in detail.

Figure 3:
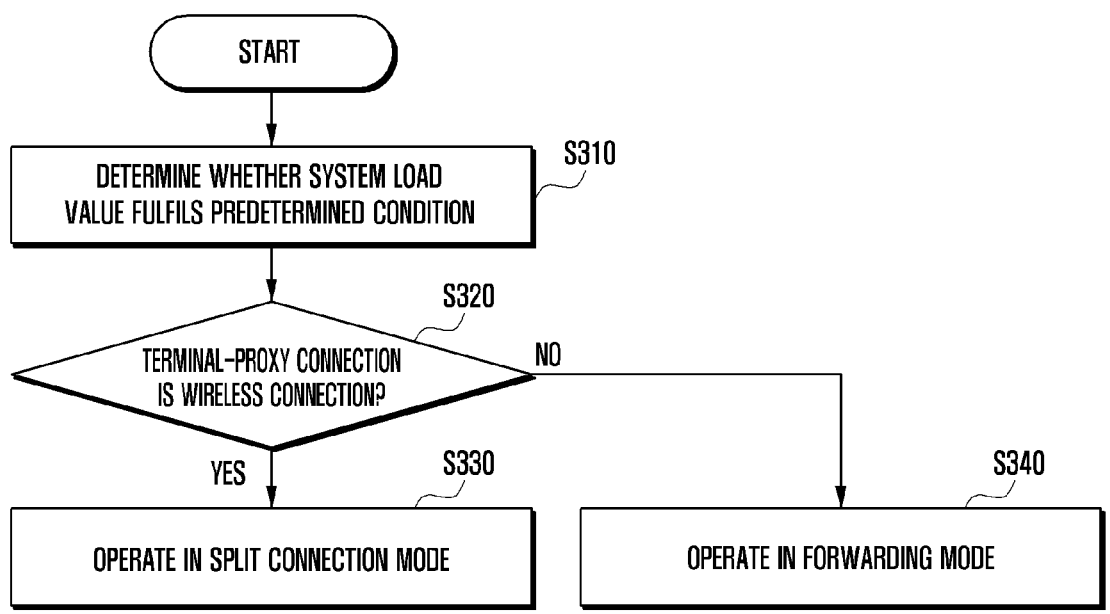
FIG. 3 illustrates a flowchart of a procedure of selecting a proxy connection method according to an embodiment of the present disclosure.

FIG. 3 illustrates a flowchart of a procedure of selecting a proxy connection mode according to an embodiment of the present disclosure.

In reference to FIG. 3, the proxy may determine at step S310 where a current system load value fulfils a predetermined condition. The proxying determinator of the proxy may acquire the current system load value from the system load monitoring unit.

As described above, the proxy system may be located inside or close to the CPE or at a place separated from the CPE. The system load value may be the load value of the CPE for the case where the proxy system is located inside the CPE or the load value of the proxy system for the case where the proxy system is located at a place separated from the CPE. In the present disclosure, the system load value may be referred to as a proxy-related system load value.

The predetermined condition may mean that the system load value indicates a state available for supporting split connection. That is, the predetermined condition may mean that the system load value is greater than a first threshold value and less than a second threshold value. However, the present disclosure is not limited to this embodiment, and it may include other embodiments in which the predetermined condition means that the system load value is greater than the first threshold value according to a setting range of the first threshold value.

If it is determined that the system load value fulfils the predetermined condition, the proxy may determine at step S320 whether the connection established between the terminal and the proxy is a wireless connection.

If it is determined that the system load value does not fulfil the predetermined condition, the proxy may enter the split connection mode or the forwarding mode depending on the system load value. That is, the proxy may process the data being transmitted/received through the connection between the terminal and the proxy in a split connection manner or forward the data to the server according to the system load value.

If the system load value fulfils the predetermined condition and the connection established between the terminal and the proxy is a wireless connection, the proxy may operate in the split connection mode, at step S330, for the terminal-proxy connection. The proxy may also process the data being transmitted/received through the terminal-proxy connection in a split connection manner.

Otherwise, if the connection established between the terminal and the proxy is not a wireless connection, the proxy operates in the forwarding mode, at step S340, for the terminal-proxy connection. The proxy may also forward the data being transmitted/received through the terminal-proxy connection to the server.

Figure 4:
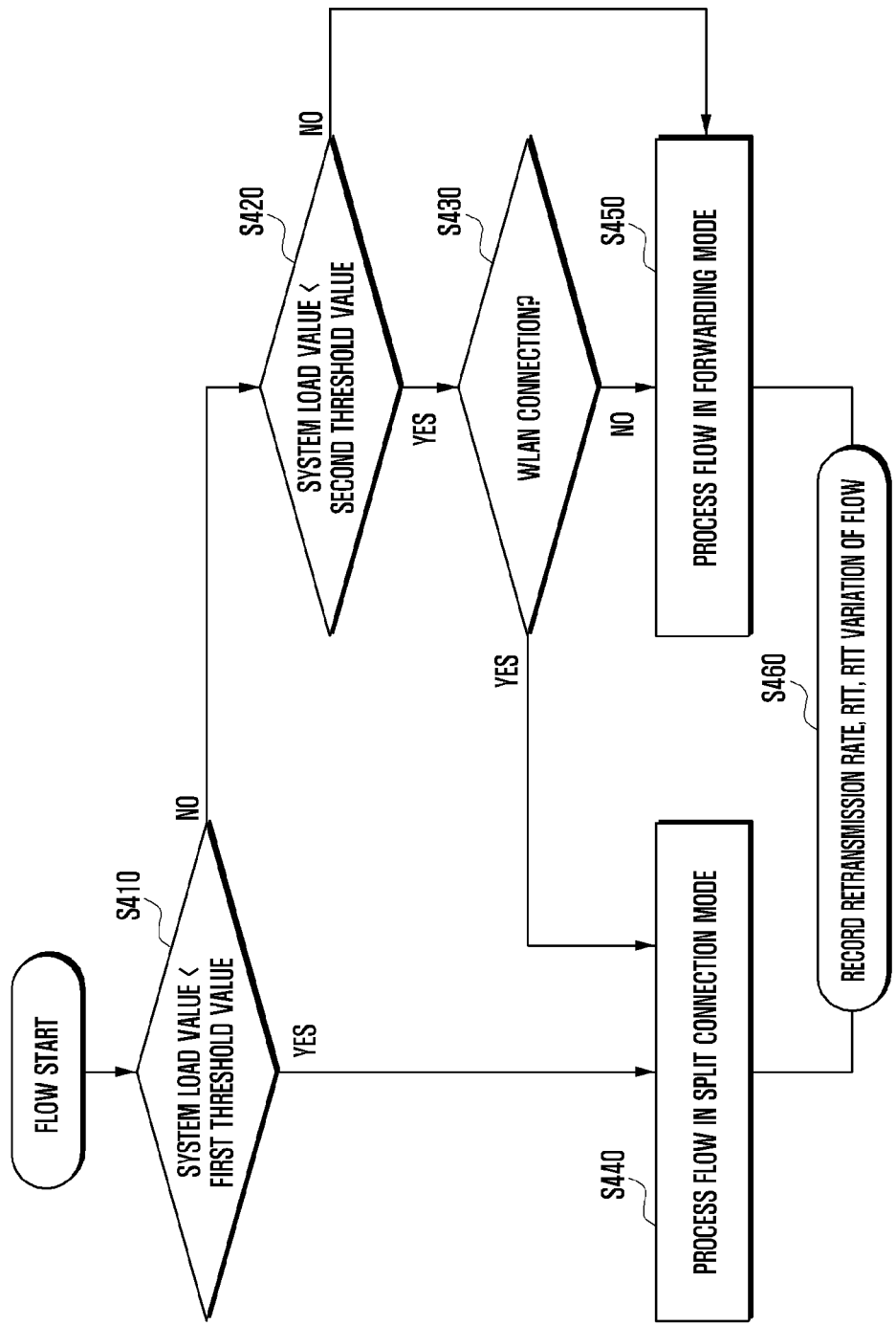
FIG. 4 illustrates a flowchart of a detailed procedure for selecting a proxy connection mode according to an embodiment of the present disclosure.

FIG. 4 illustrates a flowchart of a detailed procedure for selecting a proxy connection mode according to an embodiment of the present disclosure.

If a flow (or TCP connection) starts, the proxy may check the current system load value. In detail, the proxying determinator of the proxy may acquire the current system load value from the system load monitoring unit.

Then, the proxy may compare the checked system load value with a first threshold value at step S410.

If the system load value is less than the first threshold value, this means that the proxy system has system resources to split every flow into two connections, i.e., terminal-proxy connection and proxy-server connection, that are terminated at the application layer proxy process and process the two connections in a split connection manner.

If the system load is less than the first threshold value, the proxy may split the connection between the terminal and the server into two connections, i.e., terminal-proxy connection and proxy-server connection, that are terminated by the application layer proxy process in mediating the flows between the terminal and the server. That is, if the system load value is less than the first threshold value, the proxy may process the data flows from/to the terminal to/from the server in a split connection mode.

If the system load is greater than the first threshold value, the proxy may compare the system load with a second threshold value. Here, the second threshold value may be greater than the first threshold value. If the system load value is greater than the second threshold value, this means that the system load has reached to a level at which the proxy system cannot split, any longer, the connection between the terminal and the server into the terminal-proxy connection and the proxy-server connection that are terminated by the application layer proxy process in the split connection mode. Accordingly, if the system load value is greater than the second threshold value, the proxy may operate in the forwarding mode. That is, the proxy may forward the data being transmitted/received on the terminal-proxy connection (layer 3 forwarding or layer 3.5 forwarding).

If the system load value is less than the second threshold value, this means that the system load is at an intermediate level such that it may not be possible to process all of the flows and may only be possible to process some of the flows while processing the remaining flows in the layer 3 forwarding or layer 3.5 forwarding mode.

Accordingly, if the system load is less than the second threshold value, the proxy determines at step S430 whether the terminal-proxy connection is a WLAN connection.

If it is determined that the terminal-proxy connection is a WLAN connection, the proxy may process the flows in the split connection mode, at step S440, by splitting the connection between the server and the terminal into two connections terminated by the application layer proxy process.

If it is determined that the terminal-proxy connection is not a WLAN connection, the proxy may process the flows in the forwarding mode at step S450.

This embodiment is directed to the operation method in which, if one of the proxy connection modes (split connection, layer 3.5 forwarding, and layer 3 forwarding) is determined, the proxy connection mode is not changed until the connection is released; the proxy may process a connection established newly between the terminal and the proxy in the split connection mode or the forwarding mode as described above.

However, the present disclosure is not limited to the above embodiments, and the proxy can also switch the existing connection between the terminal and the proxy to split connection mode or forwarding mode.

If the TCP connection is released, the proxy may record, at step S460, a retransmission rate, an average RTT, and a variance of RTT after creation of the corresponding flow in association with a physical port (network interface) or an IP address or a combination of the IP address and port number for future reference.

Figure 5A:
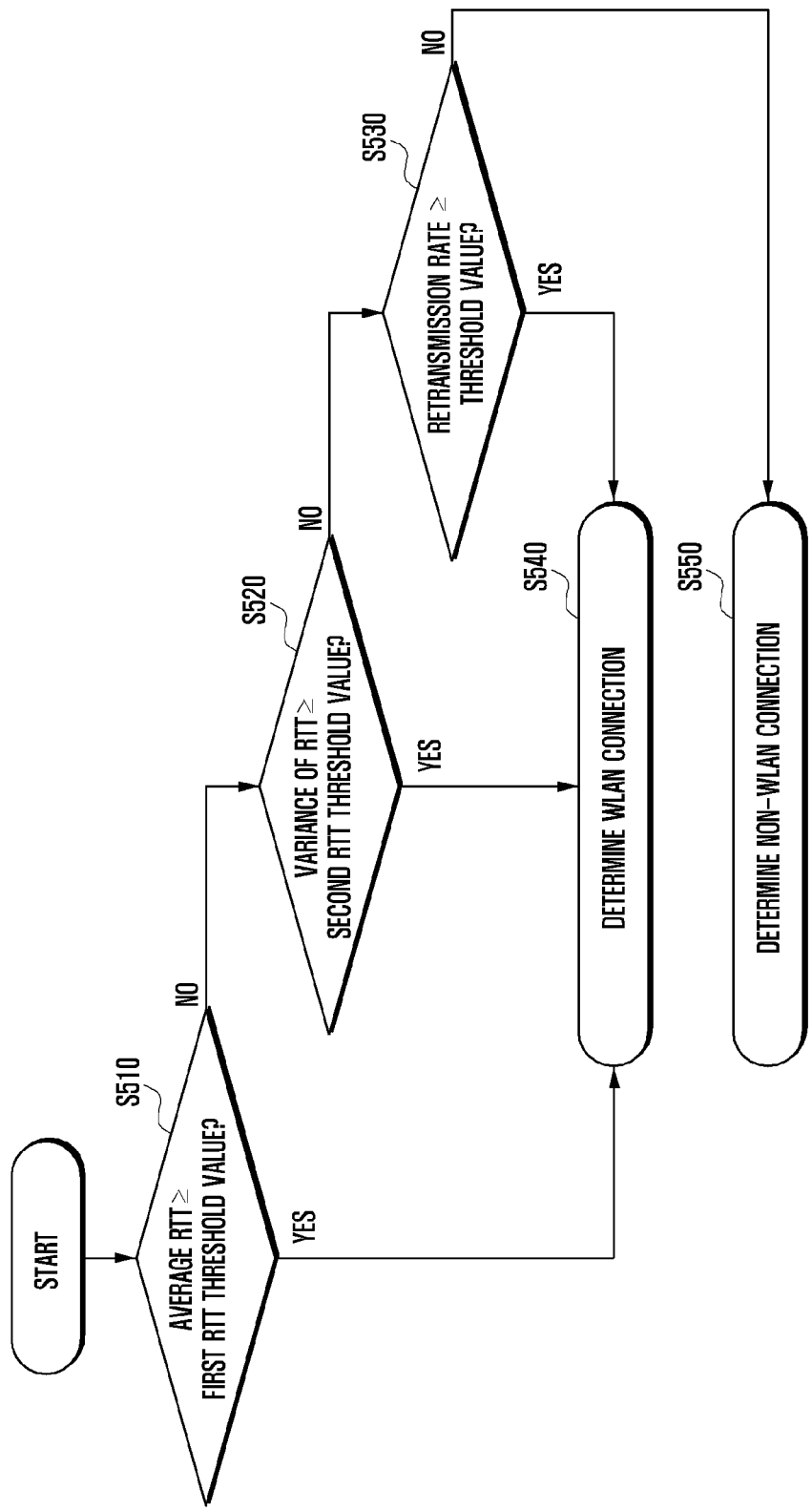
FIG. 5A illustrates a flowchart of a method for determining whether a connection established between a terminal and a proxy is a wireless connection according to an embodiment of the present disclosure.

FIG. 5A illustrates a flowchart of a method for determining whether a connection established between a terminal and a proxy is a wireless connection according to an embodiment of the present disclosure.

The WLAN determinator of the proxy may determine at step S510 whether the average RTT, which has been previously recorded in association with the physical port (network interface) of the flow, is equal to or greater than a first RTT threshold value. Here, the previous average RTT may be an average value of all RTT values stored in a memory or a value obtained by averaging a predetermined number of the recently recorded RTT values.

If it is determined that the average RTT is equal to or greater than the first RTT threshold value, the proxy may determine at step S540 that the corresponding connection is a WLAN connection.

Figure 5B:
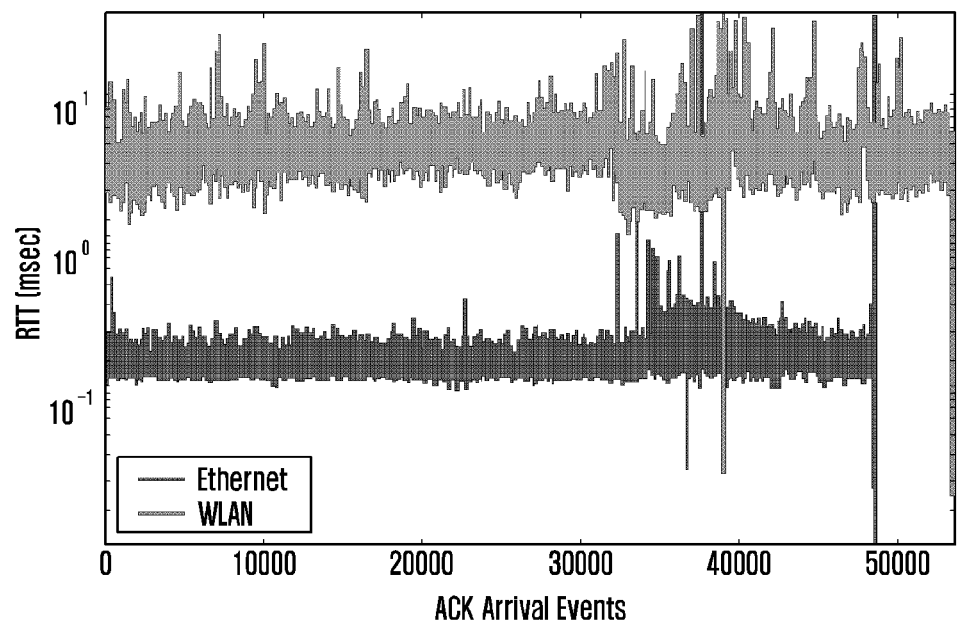
FIG. 5B illustrates a diagram of an RTT distribution difference between a wireline connection and a wireless connection.

A detailed description thereof is made with reference to FIG. 5B.

FIG. 5B illustrates a diagram of an RTT distribution difference between a wireline connection and a wireless connection.

FIG. 5B shows that the RTT value of the wireless connection can be greater than that of the wireline connection. The first RTT threshold value may be set based on the RTT values of the wireless and wireline connections. According to an embodiment of the present disclosure, the first RTT threshold may be set to 1 as an example. However, the present disclosure is not limited to this embodiment.

If the average RTT is equal to or greater than the first RTT threshold value, the proxy may determine that the corresponding connection is a WLAN connection.

With reference again to FIG. 5A, if it is determined that the average RTT is less than the first threshold value, the proxy may determine at step S520 whether the RTT variance recorded previously in association with the physical port (network interface) of the flow is equal to or greater than a second threshold value. The RTT variance may be a variance of all RTT values stored in the memory or a variance of a predetermined number of recently recorded RTT values.

If it is determined that the RTT variance value is equal to or greater than the second RTT threshold value, the proxy may determine at step S530 that the corresponding connection is a WLAN connection.

If it is determined that the RTT variance is less than the second RTT threshold, the proxy determines at step S540 whether the retransmission rate recorded in association with the physical port of the flow is equal to or greater than a predetermined retransmission rate threshold value. Here, the retransmission rate may be a value calculated from the total number of recorded retransmissions or total number of transmissions and retransmissions during a predetermined recent period or among recent transmissions and retransmissions.

If it is determined that the retransmission rate is equal to or greater than the retransmission rate threshold value, the proxy may determine at step S540 that the corresponding connection is a WLAN connection.

Otherwise, if it is determined that the retransmission rate is less than the retransmission rate threshold value, the proxy may determine at step S550 that the corresponding connection is not a WLAN connection.

However, the present disclosure is not limited to this embodiment. The proxy may determine whether the terminal-proxy connection is a WLAN connection based on at least one of the conditions of steps S510 to S530.

For example, the proxy may identify the connection with the average RTT equal to or greater than the first RTT threshold value as a WLAN connection and the connection with the average RTT less than the first RTT threshold value as a non-WLAN connection.

The proxy may perform the operations of steps S510 to S530 in a reverse or different order to determine whether the terminal-proxy connection is a WLAN connection.

For example, the proxy may determine whether the retransmission rate is equal to or greater than the retransmission rate threshold value and, if so, determine that the terminal-proxy connection is a WLAN connection. If it is determined that the retransmission rate is less than the retransmission rate threshold value, the proxy may determine whether the RTT variance value is equal to or greater than the second RTT threshold value and, if so, determine that the corresponding connection is a WLAN connection.

The CPE and Wi-Fi router may be collocated in the same space. In this case, the proxy system may receive the information indicating whether the corresponding connection is a WLAN connection from the Wi-Fi router directly. In this case, it is possible to determine whether the terminal-proxy connection is a WLAN connection without performing the above-described procedure.

Figure 6A:
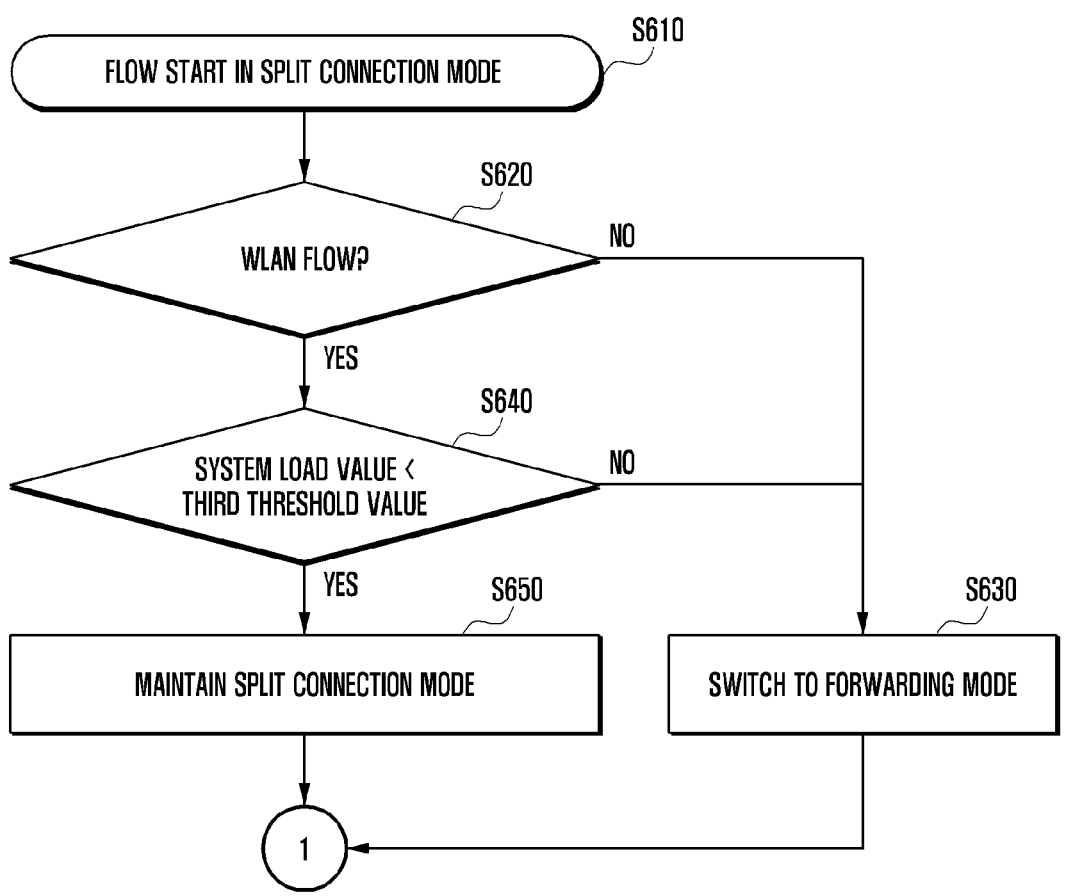
FIGS. 6A and 6B illustrate a flowchart of a procedure for determining a proxy connection mode according to an embodiment of the present disclosure.
Figure 6B:
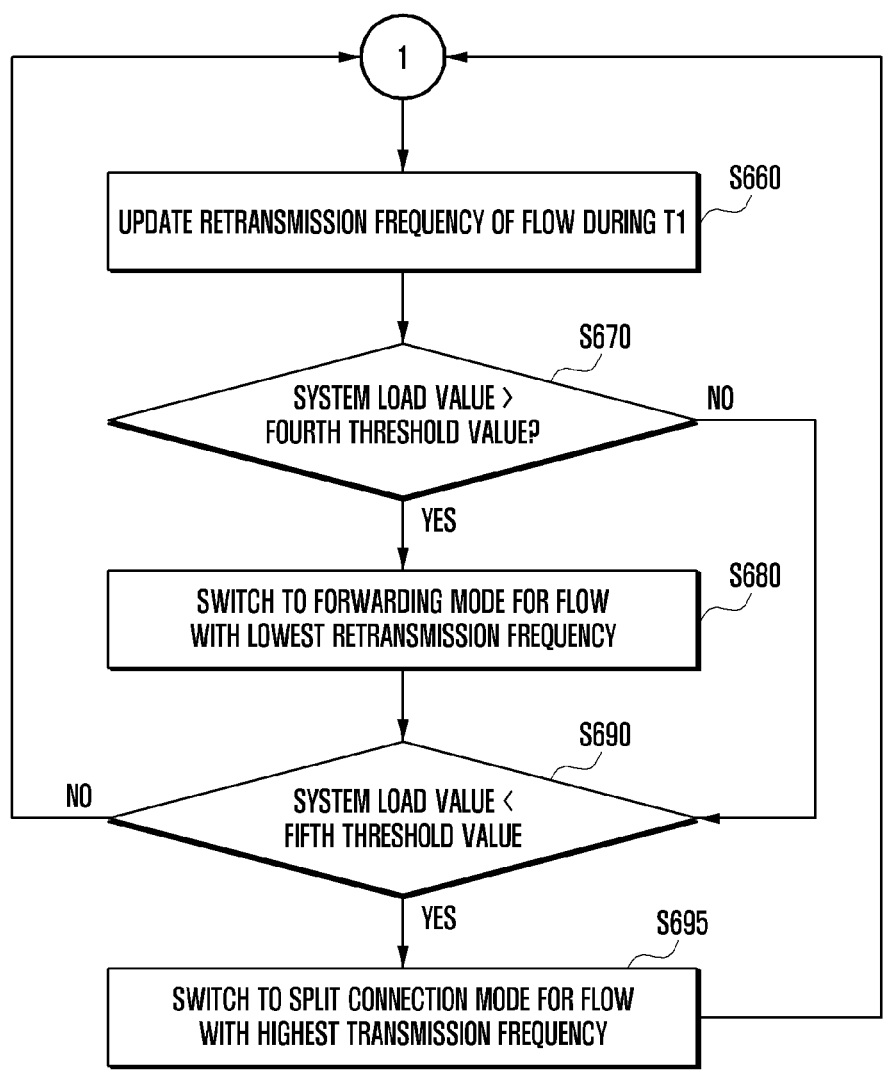

In the above procedure, the physical port may be replaced by an IP address or a combination of an IP address and a port number. FIGS. 6A and 6B are a flowchart illustrating a procedure for determining a proxy connection mode according to an embodiment of the present disclosure.

In reference to FIGS. 6A and 6B, the proxy may start operating in the split connection mode at step S610. That is, the proxy may treat a flow between a terminal and a server in the split connection mode to create a terminal-proxy connection and a proxy-server connection.

Next, the proxy may determine at step S620 whether the terminal-proxy connection is a WLAN flow.

For this purpose, the proxy may measure the RTT between the terminal and the proxy in the process of establishing the terminal-proxy connection. It may be possible to measure the RTT based on the difference between a time point when the proxy transmits a synchronization (SYN) packet to the terminal and a time point when the proxy receives an acknowledgement (ACK) packet transmitted by the terminal in response to the SYN packet. It may also be possible to perform packet exchange a few times and to calculate an average RTT instead of measuring the RTT by performing packet exchange once. The proxy may compare the checked RTT value with a predetermined RTT threshold value and, if the RTT value is greater than the threshold value, determine that the corresponding flow is a WLAN flow.

If the proxy operates in the split connection mode for processing a non-WLAN flow, this may increase the system load and gives little real gain. Accordingly, the proxy is switched to the forwarding mode at step S630. That is, the proxy may be switched to the layer 3.5 forwarding mode by initiating the TCP splicing that is capable of reducing system load in such a way of modifying the header of a packet received on one connection and forwarding the header-modified packet to the other connection. However, the present disclosure is not limited to this embodiment, and it may include an embodiment in which the proxy is switched to the layer 3 forwarding mode in which the proxy forwards the received packet to the next network interface in the IP stack.

If the terminal-proxy connection is a WLAN flow, the proxy may determine at step S640 whether the system load is less than a predetermined third threshold value. In the embodiment of this drawing, the third threshold value may be identical with or different from the first threshold value described in the embodiment of FIG. 3 or FIG. 4. Although the term "third threshold value" is used for distinction from the threshold value of the embodiment of FIG. 3 or FIG. 4, the term may be changed.

If the system load value is less than the third threshold value, the proxy may maintain the split connection mode at step S650. That is, the proxy may forward the received packet to another entity through the split connection.

Otherwise, if the system load value is greater than the third threshold value, the proxy may perform mode switching to the forwarding mode for the corresponding connection at step S630.

That is, if the system load value is greater than the third threshold value, although the corresponding connection is a WLAN flow, the proxy cannot promptly process the flow, resulting in an increase of side effects such as an increase of delay time. Accordingly, the proxy may perform mode switching to the forwarding mode for the corresponding connection. That is, the proxy may be switched to the layer 3.5 forwarding mode for modifying the header of the incoming packet received on one connection and forwarding the header-modified packet to the other connection.

Afterward, the proxy may update, at step S660, the retransmission occurrence frequencies of all individual flows that are being mediated by the proxy system during a predetermined time period (T1).

Next, the proxy may determine at step S670 whether the system load value is greater than a fourth threshold value.

If it is determined that the system load value is greater than the fourth threshold value, it is necessary to switch part of the flows being processed in the split connection mode to the forwarding mode (layer 3.5 forwarding) to reduce the load of the system.

Accordingly, the proxy may perform mode switching to the forwarding mode (layer 3.5 forwarding) for the flow with the lowest retransmission occurrence rate among the flows carried over WLAN connections.

Here, the fourth threshold value may be equal to the third threshold value or set based on or independently from the third threshold value.

For example, in the case where the fourth threshold value is equal to the third threshold value, the proxy may maintain the split connection mode for the case where the system load is less than the third threshold value and switch part of the WLAN connections to the forwarding mode for the case where the system load is equal to or greater than the third threshold value.

In the case that the fourth threshold value is not equal to the third threshold value, the fourth threshold value may be set to be greater than the third threshold value as shown in FIG. 4.

Accordingly, the proxy may not switch the operation mode even when the system load is greater than the first threshold value for the flow configured with the split connection mode and may perform mode switching to the forwarding mode for part of the WLAN connections for the case where the system load is greater than the second threshold value.

Next, the proxy may determine at step S690 whether the system load value is less than a fifth threshold value. If it is determined at step S670 that the system load value is equal to or less than the fourth threshold value or after mode switching to the forwarding mode for part of the WLAN connections at step S680, the proxy may determine whether the system load is less than the fifth threshold value.

If the system load is less than the fifth threshold value, this means that the system load is low and thus, the proxy may perform mode switching, at step S695, to the split connection mode for the flow with the highest retransmission occurrence frequency measured previously among the flows being carried over wireless connections.

Here, the fifth threshold value may be determined based on or independently from the fourth threshold value. The fifth threshold value may also be set to be less than the fourth threshold value. The fifth threshold value may also be set to be greater than the third threshold value.

If the system load is greater than the fifth threshold value or after mode switching to the split connection mode, the proxy may update the retransmission occurrence frequencies of all individual flows being mediated by the proxy system during the predetermined time period (T1) and determine whether proxy mode switching is necessary.

Meanwhile, the procedures of FIGS. 3 and 4 and FIGS. 6A and 6B may be performed in a combined manner.

For example, in the procedure of FIG. 4, if the system load is greater than the first threshold value and less than the second threshold value and if the corresponding connection is a WLAN connection, the proxy may operate in the split connection mode.

In this case, the proxy may update the retransmission frequency during the predetermined time period (T1) as described with reference to FIG. 6B and determine whether the system load value becomes greater than the second threshold value. Here, the second threshold value may be the second threshold value described with reference to FIG. 4. If the system load value becomes greater than the second threshold value, the proxy may perform mode switching to the forwarding mode for the flow with the lowest retransmission frequency.

Here, it may be possible to perform mode switching to the forwarding mode for all flows or the flow with the lowest retransmission frequency as described above according to the characteristic of the second threshold value. For example, if the second threshold value is set so as not to support the split connection mode any more when the system load becomes greater than the second threshold value, the proxy may perform mode switching to the forwarding mode for all flows. Otherwise, if the second threshold value is set so as to support the split connection mode partly even when the system load is greater than the second threshold value, the proxy may perform mode switching to the forwarding mode for part of the flows.

The proxy may compare the system load with the third threshold value set in the range between the first and second threshold values and, if the system load is less than the third threshold value, perform mode switching to the split connection mode for the flows with high retransmission frequencies.

Figure 7:
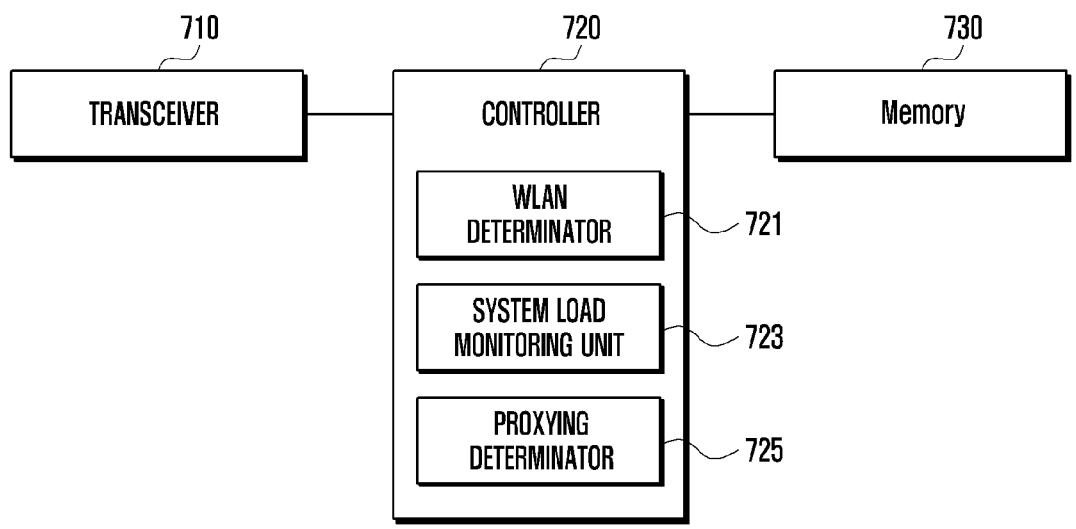
FIG. 7 illustrates a block diagram of a configuration of a proxy device according to an embodiment of the present disclosure.

FIG. 7 illustrates a block diagram of a configuration of a proxy device according to an embodiment of the present disclosure.

As shown in FIG. 7, the proxy device may include a transceiver 710, a controller 720, and a memory 730. In the present disclosure, the controller 720 may be defined as a circuit, an application-specific integrated circuit, or at least one processor. The controller 720 may include a WLAN determinator 721, a system load monitoring unit 723, and a proxying determinator 725.

The transceiver 710 may communicate signals with other network entities. The transceiver 710 may receive a packet from a terminal and send the packet to a server.

The controller 720 may control overall operations of the proxy device according to an embodiment of the present disclosure. For example, the controller 720 may control signal flows among the components to execute the operations as described above with reference to the flow charts.

In detail, the WLAN determinator 721 may determine whether a connection between a terminal and the proxy is established via a WLAN based on at least one of an RTT on the terminal-proxy connection that is measured when establishing the TCP connection, a variation of RTT value, and a previous retransmission occurrence rate at a physical port (network interface) of the connection.

The system load monitoring unit 723 may monitor the TCP connection established between the terminal and the server for the level of load in the course of mediating a TCP connection.

The proxying determinator 725 may determine to split a connection established between a terminal and a server into a terminal-proxy connection and a proxy-server connection that are terminated by an application layer proxy process, to perform TCP splicing (L3.5 forwarding) for modifying the header of the incoming packet received and transmitting the header-modified packet in the TCP stack of the kernel space without any proxy process in the user space, or perform layer 3 forwarding for delivery of the packet to the next network interface in the IP stack when mediating the TCP connection between the terminal and the server based on the information acquired by means of the WLAN determinator 721 and the system load monitoring unit 723.

In detail, the controller 720 may acquire a current system load value by means of the system load monitoring unit 723 and determine whether the current system load value fulfils a predetermined condition.

If the system load value fulfils the predetermined condition, the controller 720 may determine whether the terminal-proxy connection is a wireless connection.

Here, the predetermined condition may mean that the system load value is greater than a first threshold value and less than a second threshold value. However, the present disclosure is not limited to this embodiment, and it may include other embodiments in which the predetermined condition means that the system load value is greater than the first threshold value.

If the system load value does not fulfil the predetermined condition, the controller 720 may operate in the split connection mode or the forwarding mode depending on the system load value. That is, the controller 720 may process the data being transmitted/received over the connection between the terminal and the proxy in a split-connection mapper or forward the data to the server.

If the system load value fulfils the predetermined condition and if the terminal-proxy connection is a wireless connection, the controller 720 may configure the proxy to operate in the split connection mode for the terminal-proxy connection. The proxy may process the data being transmitted/received over the terminal-proxy connection in a split connection manner.

Otherwise, if the terminal-proxy connection is not a wireless connection, the controller 720 may operate in the forwarding mode for the terminal-proxy connection. The proxy may also forward the data being transmitted/received over the terminal-proxy connection to the server.

The controller 720 may also make a mode switching between the split connection mode and the forwarding mode depending on the system load and whether the terminal-proxy connection is a WLAN connection.

In detail, the controller 720 may start processing the newly created flow in the split connection mode. The controller 720 may determine whether the terminal-proxy connection is a WLAN flow. The determination procedure has been described above and thus is omitted herein.

If the terminal-proxy connection is not a WLAN flow, the controller 720 may make a mode switching to the forwarding mode for the corresponding connection.

If the terminal-proxy connection is a WLAN flow, the controller 720 may determine whether the system load is less than a predetermined first threshold value. The threshold value being described with reference to FIG. 7 may be equal to or different from the threshold value described with reference to FIG. 3 or FIG. 4.

If the system load value is less than the third threshold value, the controller 720 may control to maintain the split connection mode. That is, the controller 720 may forward the received packet to another entity through the split connection.

Otherwise, if the system load value is greater than the first threshold value, the controller 720 may perform mode switching to the forwarding mode for the corresponding connection.

Afterward, the controller 720 may update the retransmission occurrence frequencies of all individual flows that are being mediated by the proxy system during a predetermined time period (T1)

Next, the controller 720 may determine whether the system load value is greater than a second threshold.

If the system load value is greater than the second threshold value, the controller 720 may perform mode switching to the forwarding mode (layer 3.5 forwarding) for the flow with the lowest retransmission frequency among the flows over WLAN connections.

Next, the controller 720 may determine whether the system load value is less than a third threshold value. If the system load is less than the third threshold value, this means that the system load is low and thus the controller 720 may perform mode switching to the split connection mode for the flow with the highest retransmission occurrence frequency among the flows over wireless connections.

If the system load is greater than the third threshold value or after mode switching to the split connection mode, the controller 720 may update the retransmission occurrence frequencies of all individual flows being mediated by the proxy system during the predetermined time period (T1) and determine whether proxy mode switching is necessary.

The controller 720 may also control overall operations of the proxy according to an embodiment of the present disclosure.

The memory 730 may store at least one of the informations being transmitted/received by means of the transceiver 710 or the information generated by the controller 720. For example, the memory 730 may record a retransmission rate, an average RTT, and a variance of RTT after the creation of the corresponding flow in association with a physical port (network interface) or an IP address or a combination of the IP address and port number. The memory 730 may also record the retransmission frequencies of the flows.

Second Embodiment

With the increase of the Wi-Fi penetration rate, WLAN-based Internet access has been popularized, and almost all electronic appliances are being connected to the Internet through wireline or wireless channels. However, a terminal that wirelessly connects to an indoor WLAN access point (AP) may undergo TCP performance degradation caused by low radio channel quality at a position located far from the WLAN AP or separated by a wall from the WLAN AP.

In order to achieve user-experienced performance enhancement in such a wireless networking environment, it may be considered to employ a split TCP technique instead of the legacy TCP congestion control technique designed to be suitable for wireline network environments. The split TCP is a technique of splitting a connection established between a server and a terminal into two connections (i.e., server-proxy connection and proxy-terminal connection) and, in the present disclosure, the terms "TCP connection split," "proxying," and "proxy process" are interchangeably used along with split TCP.

For a legacy mobile broadband (MBB) service of an internet service provider (ISP), a service gateway terminal can be arranged in a gateway through which mobile terminals connect to the Internet to take charge of elaborate control and data service management.

A proxy device may be used for such control and data service management. That is, a proxy may be used for processing data in the application layer for the purpose of checking data content and providing content property-based services (e.g., advertisement insertion).

Here, in order to solve the performance degradation problem caused by system overload of the service gateway in use of a proxy, it may be considered to perform the proxy process flexibly for a part of the traffic.

If the proxy process is performed on the whole traffic as described above, this may increase the system load. Accordingly, it is difficult to perform the proxy process on the whole traffic.

In this respect, it may be possible to consider a method for analyzing data contents, splitting, if a proxy process (service provided by an application) is necessary, the TCP connection, and then coupling the connections after completing the service. In the case of using this method, a receive window size set to 0 is transmitted to the server to stop data transmission in the course of releasing and reestablishing a connection for high-speed traffic or delay-sensitive traffic and, as a consequence, a user may feel data traffic interruption.

That is, if the connection release operation for a proxy process is performed while the user is watching a video streaming, it may cause interruption of the video stream.

Although advantageous in terms of reducing system load by means of the proxy, the above method has the drawback of traffic interruption impacting the service in use by the user.

In order to overcome the above problem, the present disclosure proposes a method for performing the proxy process selectively on a flow for a terminal to improve flow performance over a radio link characterized by a low quality and user-experienced quality.

The present disclosure also proposes a method for performing the proxy process selectively for a user's terminal experiencing low radio channel quality at a position separated by a wall from the WLAN AP or located far from an indoor WLAN AP or affected by electric wave interferences from other wireless terminals in order to improve TCP performance and user-experienced quality effectively.

Figure 8:
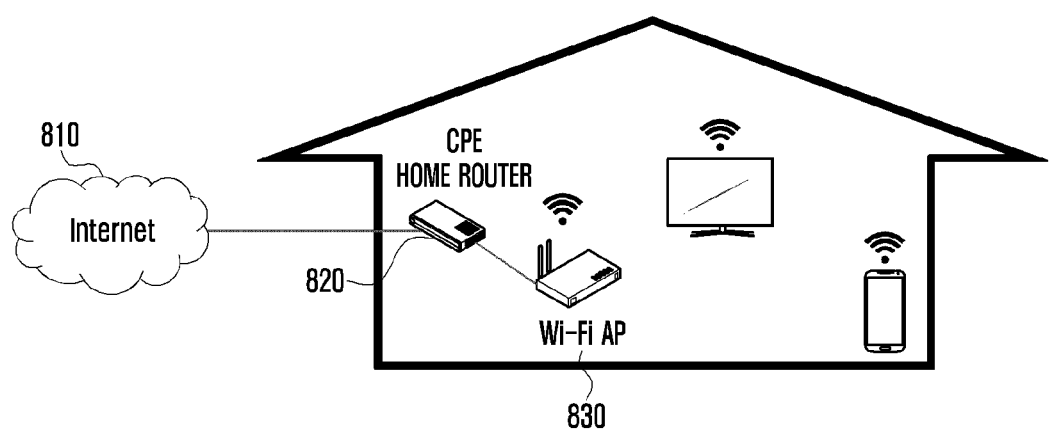
FIG. 8 illustrates a diagram of an indoor environment according to an embodiment of the present disclosure.

FIG. 8 illustrates a diagram of an indoor environment according to an embodiment of the present disclosure.

In reference to FIG. 8, a home router (e.g., indoor device, CPE, and home gateway) 820 may connect to an Internet server 810 through a wireline. In the indoor environment, a Wi-Fi AP (or WLAN AP) 830 may be installed to offer wireless Internet access for terminals.

As described above, it may occur that the packet loss rate increases when a terminal is located at a position physically separated from the indoor WLAN AP or far from the WLAN AP or vulnerable to electric wave interferences from other wireless terminals in the indoor environment; if the proxy process is performed on all flows, this may increase system load. There is therefore a need of overcoming this problem, and a detailed description thereof is made later.

As described above, the proxy device may be located in an indoor device or at a separated place. The home router and the Wi-Fi AP may be implemented as a single device (or integrated into a single device) or in the forms of separate devices.

Figure 9:
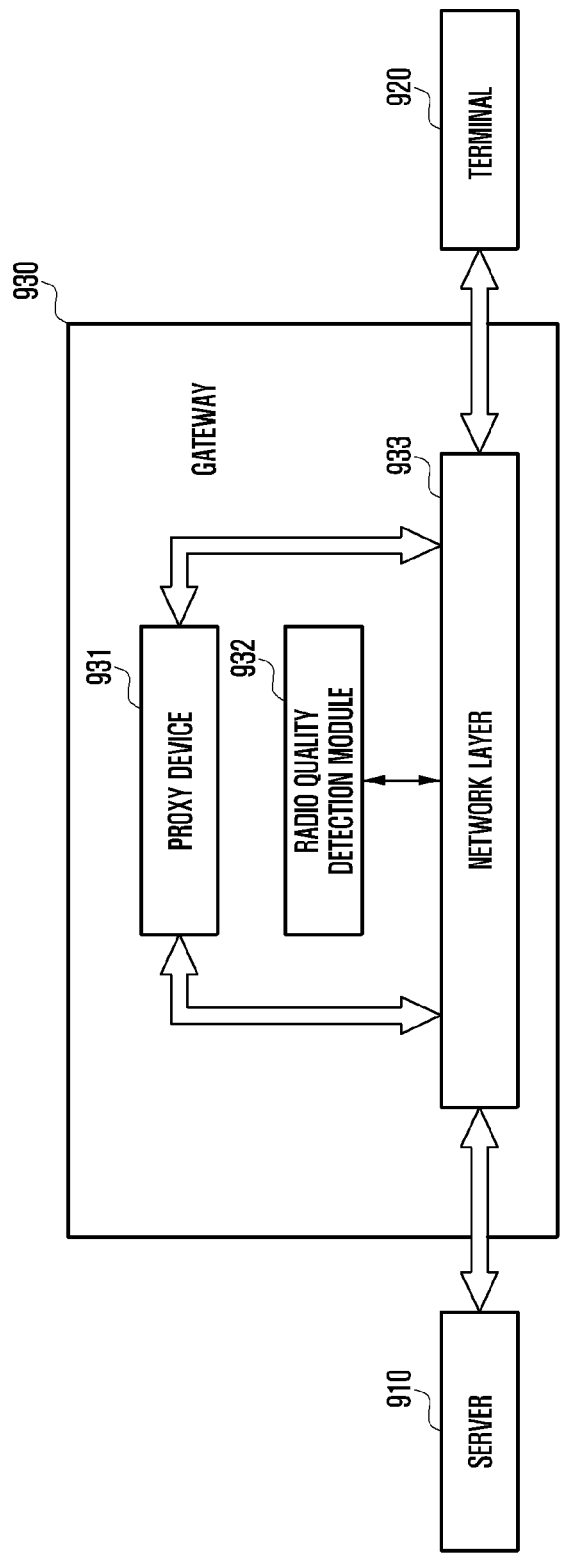
FIG. 9 illustrates a diagram of a configuration of a network according to an embodiment of the present disclosure.

FIG. 9 illustrates a diagram of a configuration of a network according to an embodiment of the present disclosure.

In reference to FIG. 9, a home gateway (router) 930 may be interposed between a server 910 providing a contents service and a wirelessly-connected terminal 920 as a client to detect a TCP connection between the server 910 and terminal 920 and relay data between the server 910 and the terminal 920.

The home gateway (router) 930 may include a proxy device 931 for network performance enhancement and a radio quality detection module (or radio quality detector) 932 for measuring radio link quality of the terminal.

The radio quality detection module 932 is responsible for traffic management and monitoring functions on a network layer 933. The radio quality detection module 932 may manage connection information of the traffic on the network layer 933, traffic amount and number of packets per connection, and packet sequence information.

The radio quality detection module 932 monitors for the packets transmitted from the server 910 to the client 920 and manages missing sequence information separately. The radio quality detection module 932 may monitor for acknowledgement (ACK) packets received from the client 920 and, if there is missing sequence information related to an ACK packet, compare the sequence information with the sequence information of the missing packet among the packets received from the server 910; if the sequence informations mismatch, the radio quality detection module 932 may determine that packet loss has occurred on the radio link. If a packet loss rate becomes greater than a threshold value, the radio quality detection module 932 may determine that the terminal receiving the corresponding flow operates on a quality-degraded radio link.

In this case, the radio quality detection module 932 may send the proxy device 931 the information indicating that the terminal receiving the flow with the packet loss rate greater than a threshold value operates on a quality-degraded radio link, and the proxy device 931 generates a command to the network layer 933 for performing a proxy process on the corresponding flow such that the network layer 933 intercepts packets and forwards the packets to the proxy. Here, the information that the proxy device 631 generates to the network layer 933 may include information related to a rule instructing to forward packets with a specific IP address to the proxy.

In detail, the radio quality detection module 932 may send the network layer 933 and the proxy device 931 the information on the flow of the quality-degraded link of the terminal such that the proxy performs a proxy process on the corresponding flow.

The proxy may generate an ACK corresponding to the packet transmitted by the network layer 933 and transmit the ACK to the network layer 933, which transmits the ACK to the server 910. This process may be referred to as proxying process or just proxying.

In the present disclosure, the radio quality detection module 932 may calculate a packet loss rate and send the packet loss rate to the proxy device 931 and, if the packet loss rate is greater than a predetermined threshold value, the proxy device 931 may command the network layer 933 to pass up the flow to the proxy device 931.

Although FIG. 9 depicts that both of the proxy device 931 and the radio quality detection module 932 are included in the home gateway 930, each of the proxy device 931 and the radio quality detection module 932 may be independently located at a place separated from the place where the home gateway is located or included in at least one of indoor devices. The radio quality detection module 932 may also be included in the proxy device 931. In the following description, it is assumed that the proxy device 931 and the radio quality detection module 932 are included in the home gateway 930.

The home gateway (router) may be implemented in the form of being separated from or integrated with a Wi-Fi AP. The Wi-Fi AP may have the information on the terminals connected thereto. Because it is assumed that the proxy device is included in the home gateway in this embodiment, distinct descriptions are made of the case where the home gateway is separated from the Wi-Fi AP and the case where the home gateway is integrated with the Wi-Fi AP. However, even when the proxy device is not included in the home gateway, it may also be implemented in the form of being separated from or integrated with a Wi-Fi AP.

As described above, although it is ideal for the proxy device to perform a proxy process on all of network flows to a wirelessly-connected terminal for network performance enhancement, the proxy processing may increase system load, resulting in a system degradation phenomenon. Accordingly, it may be preferred to perform a proxy process selectively on the flows that need the proxy process.

In the case of performing the proxy process for a terminal located close to a Wi-Fi AP or operating on a link with poor radio quality, it is difficult to expect significant network performance enhancement. That is, a wirelessly-connected terminal having a link with good radio quality may enjoy good network quality (bandwidth) with no proxy process. The present disclosure aims to provide a method of performing a proxy process for wirelessly-connected terminals operating on links with poor radio quality to protect against network performance degradation caused by traffic loss and thus improve user-experienced service quality.

Figure 10:
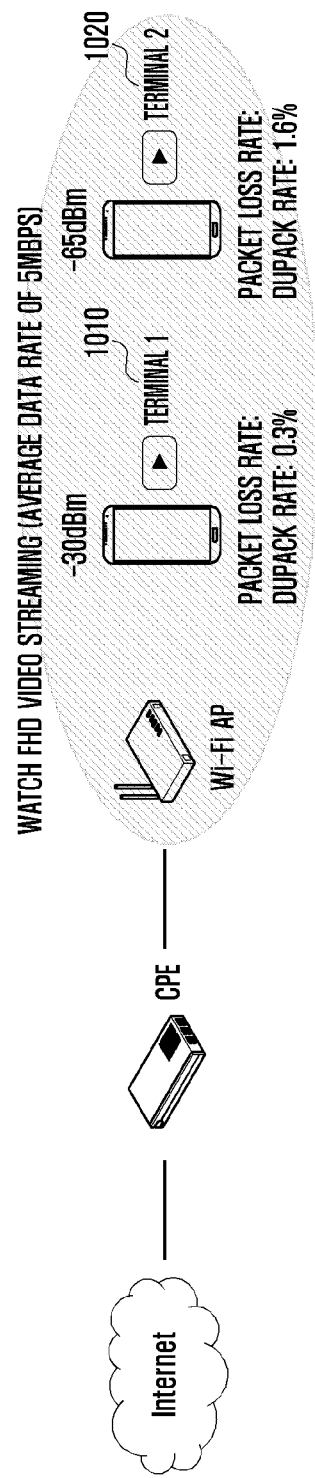
FIG. 10 illustrates a diagram of a method for performing a proxy process selectively on a connection of a terminal according to an embodiment of the present disclosure.

FIG. 10 illustrates a diagram of a method for performing a proxy process selectively on a connection of a terminal according to an embodiment of the present disclosure.

The drawing depicts a method for performing a proxy process selectively on a radio connection in the case where a Wi-Fi AP is separated from a home gateway. The home gateway implemented in the form of being separated from the Wi-Fi AP has no information on a terminal that wirelessly connects to the Wi-Fi AP and thus cannot easily determine the radio condition of the terminal.

Accordingly, a radio quality detection module may measure a packet loss rate on the radio link. The radio quality detection module may measure a number of duplicate ACKs (DupACK) received from the terminal to check for the number of missing packets. The radio quality detection module may check for the total number of packets transmitted by the terminal and calculate a packet loss rate on the radio link using the number of missing packets and the total number of packets.

The proxy device may check the packet loss rate to determine whether the packet loss rate is greater than a threshold value and perform a proxy process on the TCP connection carrying the corresponding flow for the terminal.

FIG. 10 is depicted under the assumption that terminal 1 1010 and terminal 2 1020 are located indoors. It is shown that terminal 1 1010 is located closer to a Wi-Fi AP than terminal 2 1020. The packet loss rates (DupACK rates) of terminals 1 and 2 1010 and 1020 are 0.3% and 1.6%, respectively, and this means that the packet loss rate increases as the distance from the Wi-Fi AP increases.

Assuming that a threshold value of the packet loss rate is 1%, the packet loss rate of terminal 2 1020 is greater than the threshold value. In this case, the proxy device may perform a proxy process on the TCP connection of terminal 2 1020.

Figure 11:
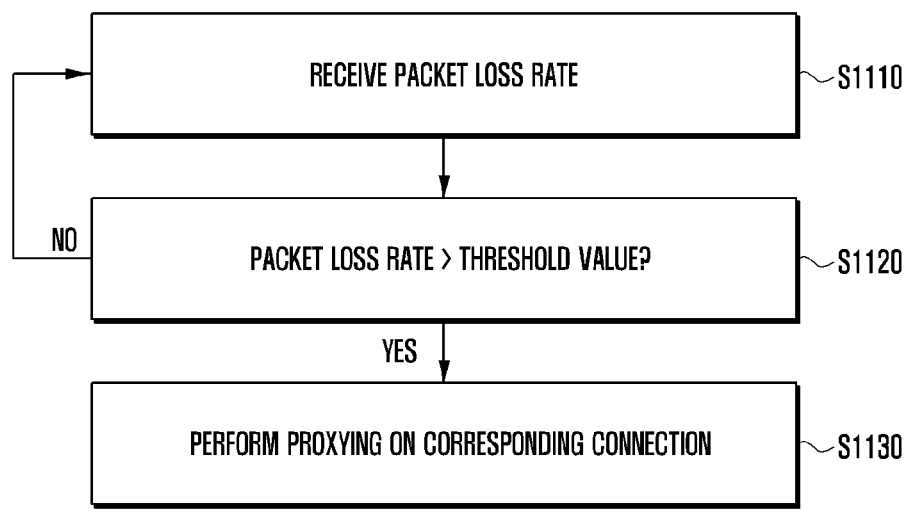
FIG. 11 illustrates a flowchart of a method for performing a proxy process selectively on a connection of a terminal according to an embodiment of the present disclosure.

FIG. 11 illustrates a flowchart of a method for performing a proxy process selectively on a connection of a terminal according to an embodiment of the present disclosure.

In reference to FIG. 11, the proxy device may receive the information on a packet loss rate on the radio link of the terminal from the radio quality detection module at step S1110.

If the radio quality detection module is included in the proxy device as described above, the proxy device may check for the packet loss rate on the radio connection of the terminal.

How to check for the packet loss rate is described later in detail.

Next, the proxy device may determine at step S1120 whether the packet loss rate is greater than a predetermined threshold value.

If the packet loss rate is greater than the threshold value, the proxy device may perform a proxy process, at step S1130, on the connection with the packet loss rate greater than the threshold value.

In detail, the proxy device may send the network layer of the home gateway the information instructing to pass up the packets being transmitted/received on the corresponding connection to the proxy device.

That is the proxy device may send a control message to the network layer agent. Upon receipt of the control message, the network layer agent may intercept and pass up the corresponding flow to the proxy device residing on the application layer, and the proxy device may send out the corresponding flow to the terminal. The proxy device may generate an ACK message corresponding to the received packet down to the network layer agent, which transmits the ACK message to the server. In this manner, it may be possible to achieve performance enhancement by splitting the connection between the server and the terminal.

If the packet loss rate is not greater than the threshold value, the proxy device may maintain the connection and return to step S1110 to receive the packet loss rate subsequently.

Figure 12:
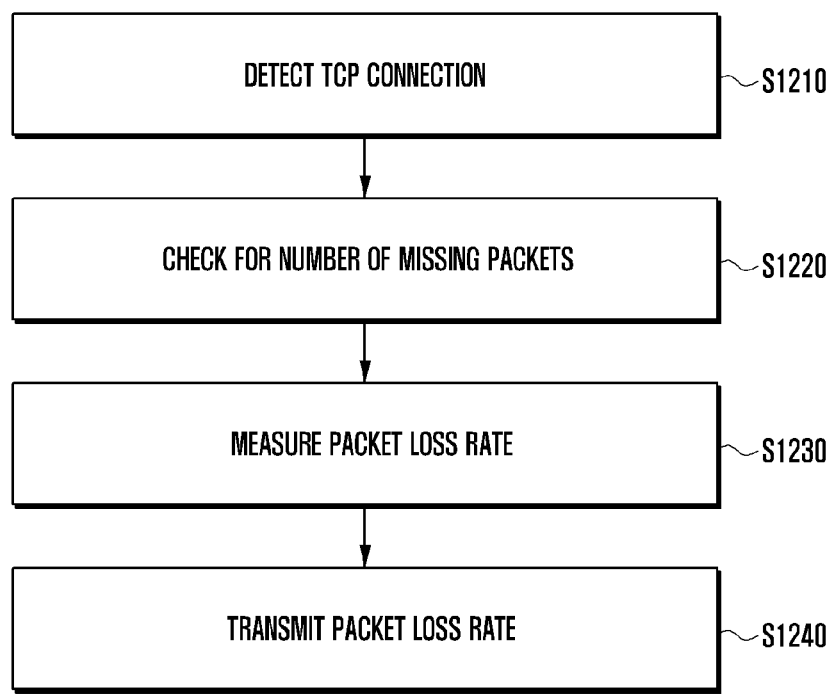
FIG. 12 illustrates a flowchart of a method for checking for a packet loss rate according to an embodiment of the present disclosure.

FIG. 12 illustrates a flowchart of a method for checking for a packet loss rate according to an embodiment of the present disclosure.

The radio quality detection module may detect a TCP connection between a terminal and a server at step S1210. The radio quality detection module may monitor each TCP connection for IP information, numbers of transmission and reception packets, bidirectional traffic amount, and TCP data sequence information.

The radio quality detection module may monitor the TCP connection to the server for sequence information of TCP data from the server and store missing sequence information in a memory.

Next, the radio quality detection module may check for the number of missing packets at step S1220. It may be possible to check for the number of missing packets based on the number of DupACKs received from the terminal.

Next, the radio quality detection module may measure a packet loss rate at step S1230.

The radio quality detection module may count the number of packets transmitted to the terminal per TCP connection. Accordingly, the radio quality detection module may measure the packet loss rate based on the checked number of missing packets and the number of packets transmitted to the terminal.

Next, the radio quality detection module may send the proxy device the packet loss rate at step S1240.

However, the present disclosure is not limited to this embodiment. The radio quality detection module may check for the number of packets transmitted to the terminal and the number of missing packets based on the number of DupACKs received from the terminal and send the information on the numbers of transmitted packets and missing packets to the proxy device. The proxy device may calculate the packet loss rate to determine whether to perform a proxy process on the corresponding connection.

The packet loss rate can be high in a radio network. Even when the terminal is located close to a Wi-Fi AP or at a position with no interference, packet loss may occur. Accordingly, it may be necessary to designate a threshold value of a packet loss occurrence rate, i.e., tolerable packet loss rate, to judge a bad radio condition when the packet loss rate is greater than the threshold value.

If the packet loss rate on a radio link of a wirelessly-connected terminal is greater than the predetermined threshold value, the proxy device may determine that the radio condition is poor and thus make a decision to perform a proxy process on the corresponding flow.

Figure 13:
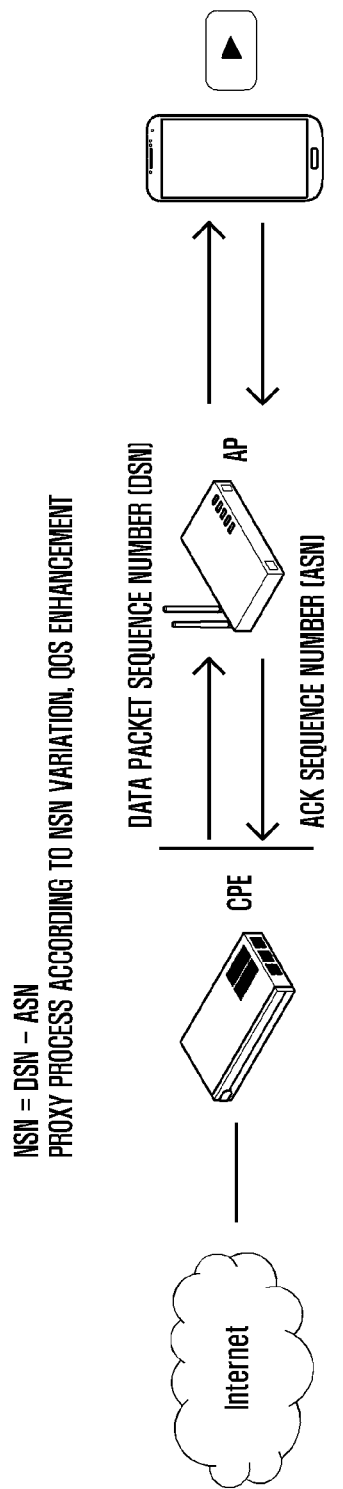
FIG. 13 illustrates a diagram of a method for performing a proxy process selectively on a connection to a terminal according to another embodiment of the present disclosure.

FIG. 13 illustrates a diagram of a method for performing a proxy process selectively on a connection to a terminal according to another embodiment of the present disclosure.

FIG. 13 is directed to a method for performing the proxy process selectively on a radio connection when a home gateway is implemented in the form of being separated from a Wi-Fi AP.

In the drawing, the radio quality detection module may detect a radio condition based on packet sequence numbers. In detail, the radio quality detection module may monitor the packets from a server to a terminal and the ACKs from the terminal to the server for data packet sequence numbers (DSNs) and ACK sequence numbers (ASNs).

The radio quality detection module may compare a DSN and an ASN at a certain time point to calculate difference between the sequence numbers. Here, the difference between the DSN and ASN may be referred to as network sequence number (NSN) or sequence number difference value. The radio quality detection module may determine the quality condition on the radio link based on the NSN value.

For example, if the difference between the DSN and ASN is greater than a predetermined value at a certain time, the radio quality detection module may determine that the quality condition on the radio link is poor. If the difference between the sequence number of the transmitted packet and the sequence number of the ACK is large, this means that the packet transmission is not smooth.

If the rate of change of the difference between the DSN and ASN is greater than a predetermined threshold rate of change, the radio quality detection module may determine that the quality condition of the radio link is poor. The rate of change of the difference between the DSN and ASN may be measured during a predetermined time period.

If the rate of change of the difference between the DSN and ASN is greater than the threshold rate of change during the predetermined time period, the radio quality detection module may determine that the quality condition of the radio link is poor.

It may also be possible for the radio quality detection module to determine that the quality condition of the radio link is bad when an average of the difference values between the DSN and ASN is greater than a predetermined threshold value.

In the present disclosure, the sequence number difference, the rate of change of sequence number difference, and the average of sequence number differences may be collectively referred to as sequence number difference-related information.

The proxy device may check that the quality condition of the radio link is poor and perform a proxy process on the TCP connection of the terminal that includes the radio connection with the poor-quality condition.

Figure 14:
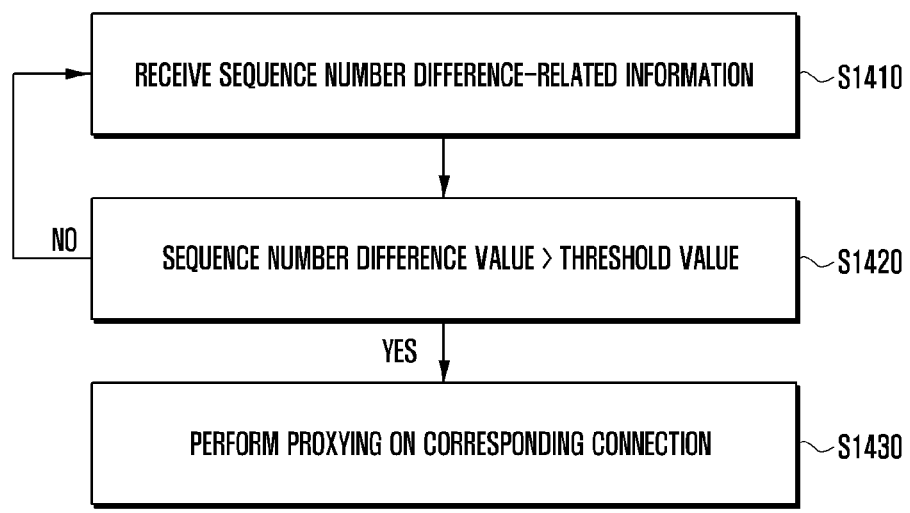
FIG. 14 illustrates a flowchart of a method for performing a proxy process selectively on a connection of a terminal according to another embodiment of the present disclosure.

FIG. 14 illustrates a flowchart of a method for performing a proxy process selectively on a connection of a terminal according to another embodiment of the present disclosure.

In reference to FIG. 14, the proxy device may receive, at step S1410, information on a difference between a sequence number of a packet transmitted from a server to a terminal and a sequence number of an ACK transmitted from the terminal to the server (hereinafter, referred to as sequence number difference-related information).

As described above, if the radio quality detection module is included in the proxy device, the proxy device may check for the sequence number difference-related information by means of the radio quality detection module.

How to check for the sequence number difference-related information is described later in detail.

Next, the proxy device may determine at step S1420 whether the sequence number difference-related information is greater than a threshold value.

In detail, the proxy device may determine whether the sequence number difference value is greater than the threshold value. It may also be possible to determine whether the rate of change of the sequence number difference is greater than a threshold value or whether the average value of the sequence number differences is greater than a threshold value.

If the sequence number difference-related information is greater than the threshold value, the proxy device may perform, at step S1430, a proxy process on the connection with the sequence number difference value greater than the threshold value. In this case, the proxy device may send information on the corresponding flow to the network layer agent of the home gateway, and the network layer agent passes up the corresponding flow to the proxy device. The flow information may include the information instructing to pass up the packets flowing on the corresponding connection to the proxy device.

The proxy device sends a control message to the network layer agent. The network layer agent may pass up the corresponding flow to the proxy device residing on the application layer, and the proxy device may send out the corresponding flow to the terminal. The proxy device may also generate an ACK message corresponding to the received packet down to the network layer agent, which transmits the ACK message to the server. In this manner, it may be possible to achieve performance enhancement by splitting the connection between the server and the terminal.

If the sequence number difference-related information is not greater than the threshold value, the proxy device may maintain the connection and return to step S1410 to receive the sequence number difference value subsequently.

Figure 15:
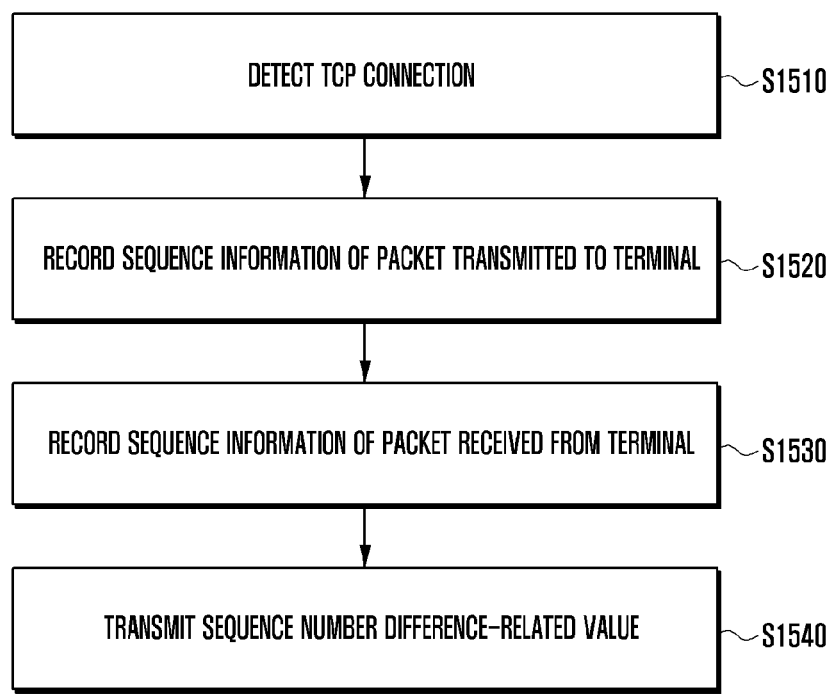
FIG. 15 illustrates a flowchart of a method for checking for a difference between a sequence number of a packet to a terminal and a sequence number of a packet from the terminal according to an embodiment of the present disclosure.

FIG. 15 illustrates a flowchart of a method for checking for a difference between a sequence number of a packet to a terminal and a sequence number of a packet from the terminal according to an embodiment of the present disclosure.

The radio quality detection module may detect a TCP connection between a terminal and a server at step S1510. The radio quality detection module may monitor each TCP connection for IP information, numbers of transmission and reception packets, bidirectional traffic amount, and TCP data sequence information.

At step S1520, the radio quality detection module may record the sequence information of the packet transmitted to the terminal.

At step S1530, the radio quality detection module may record the sequence information of the packet received from the terminal.

The radio quality detection module may calculate the difference between the sequence information of the packet transmitted by the server and the sequence information of the packet received from the terminal at a certain time point.

The radio quality detection module may also calculate a rate of change of the difference between the sequence information of the packet transmitted by the server and the sequence information of the packet received from the terminal during a predetermined period.

The radio quality detection module may also calculate an average value of the differences between the sequence information of the packet transmitted by the server and the sequence information of the packet received from the terminal during the predetermined period.

At step S1540, the radio quality detection module may send the proxy device the calculated information as the sequence number difference-related information.

Figure 16:
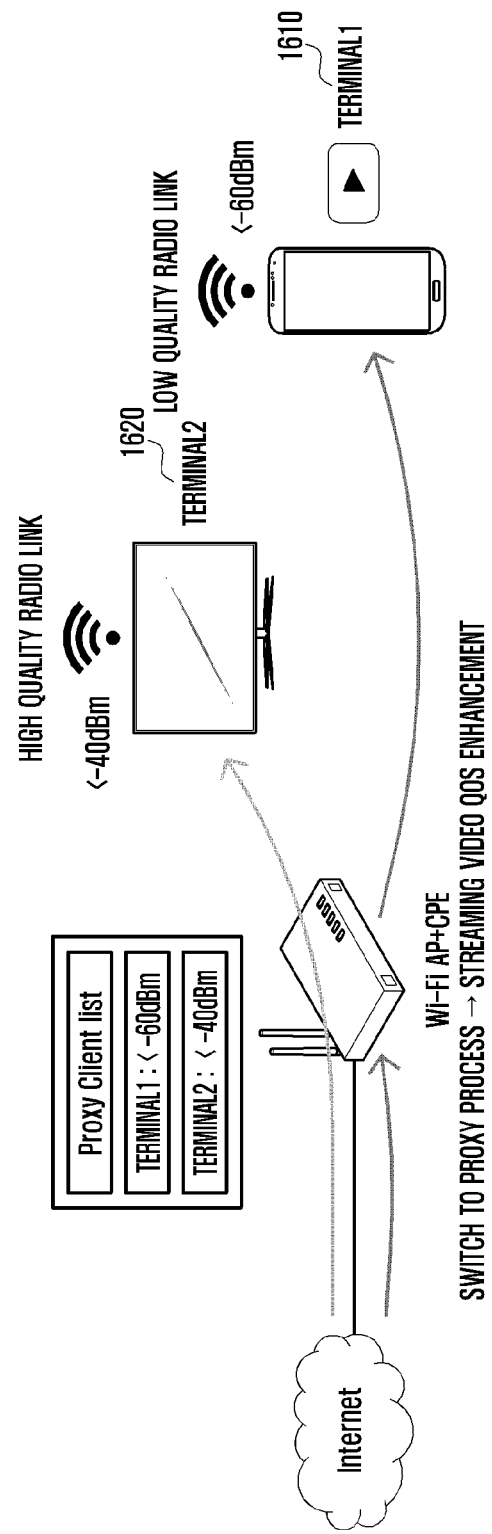
FIG. 16 illustrates a diagram of a method for performing a proxy process selectively on a connection of a terminal according to another embodiment of the present disclosure.

FIG. 16 illustrates a diagram of a method for performing a proxy process selectively on a connection of a terminal according to another embodiment of the present disclosure.

FIG. 16 is directed to a method for performing the proxy process selectively on a radio connection when a home gateway is implemented in the form of being integrated with a Wi-Fi AP. In this embodiment, there is an interface between the Wi-Fi AP and the home gateway for exchanging information. The home gateway integrated with a Wi-Fi AP or connected to a Wi-Fi AP through an interface may acquire the information on a terminal that is wirelessly connected to the Wi-Fi AP and thus determine the radio condition of the wirelessly connected terminal.

If the radio condition-related information of the terminal is less than a predetermined threshold value, the proxy device may perform a proxy process on the connection of the corresponding terminal. The radio condition-related information may include a received signal strength indicator (RSSI) and a signal-to-noise ratio (SNR); if the proxy device detects a terminal with the radio condition-related information value less than the threshold value, the proxy device may perform the proxy process on the connection of the corresponding terminal.

Here, the proxy device may include the terminal in a management list such that a packet received from the terminal included in the management list is processed by the proxy device.

In the embodiment of FIG. 16, it is assumed that terminal 1 1610 and terminal 2 1620 are operating indoors. It is assumed that the received signal strength is −60 dB at terminal 1 1610 and −40 dB at terminal 2 1620.

In this case, the proxy device may assume that terminal 1 1610 has a radio connection with a low radio quality and terminal 2 1620 has a radio connection with a high radio quality. Accordingly, the proxy device may include the terminal 1 1610 in the management list and, if a packet for terminal 1 1610 is received, perform the proxy process on the connection of terminal 1 1610.

In this embodiment, the proxy device may check for the radio condition of a terminal in the initial connection procedure between the terminal and a server to determine whether to operate in a proxy-based split connection mode. In detail, if a synchronization (SYN) packet for a TCP connection is received from a terminal, the proxy device may determine whether to operate in the split connection mode based on the radio condition of the terminal.

After a connection has been established between a terminal and a server, if the terminal moves and thus the radio condition becomes poor, the proxy device may check for the radio condition of the terminal to perform the proxy process on the connection between the terminal and the server.

Figure 17:
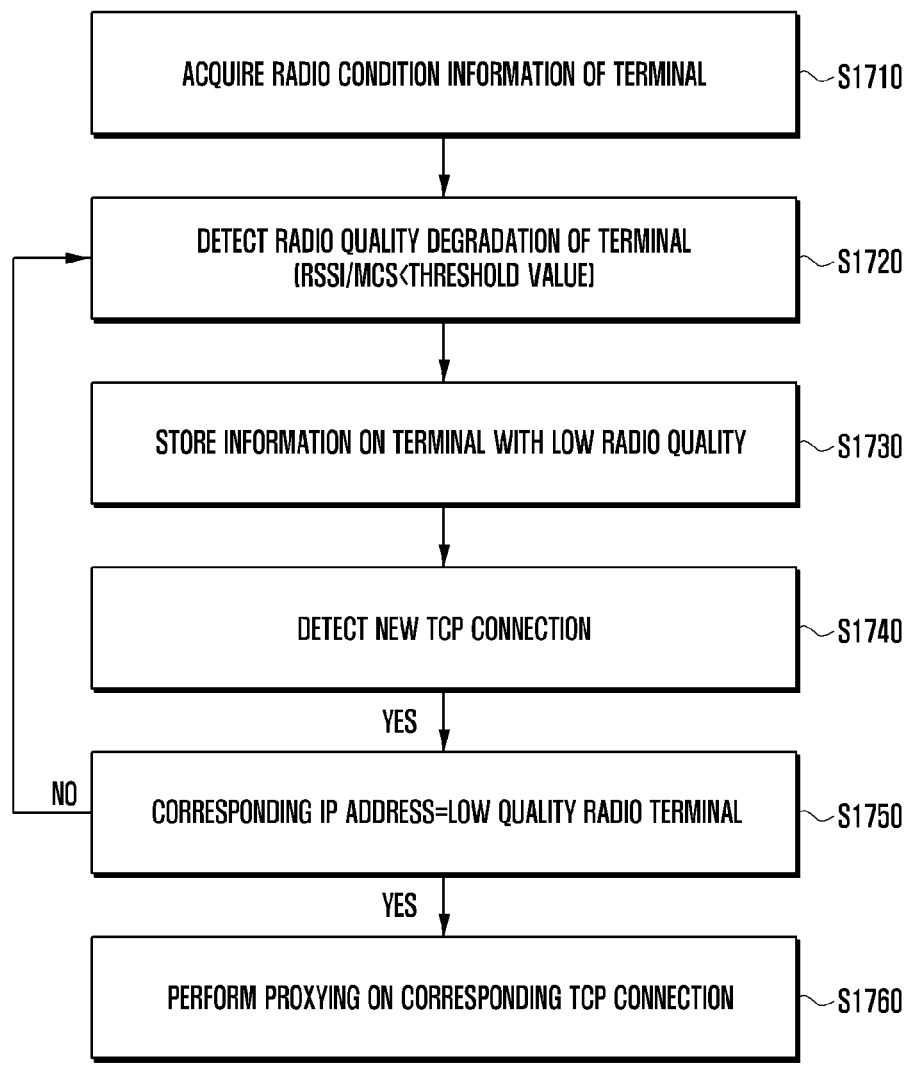
FIG. 17 illustrates a flowchart of a method for performing a proxy process selectively on a connection of a terminal according to another embodiment of the present disclosure.

FIG. 17 illustrates a flowchart of a method for performing a proxy process selectively on a connection of a terminal according to another embodiment of the present disclosure.

In reference to FIG. 17, the proxy device may acquire radio condition-related information of a wirelessly-connected terminal at step S1710. The Wi-Fi AP may acquire the radio information of the terminal that is wirelessly connected thereto and, in this embodiment where the proxy device is integrated with a Wi-Fi AP or connected to a Wi-Fi AP through an interface, the proxy device may acquire the radio information. The radio information may include at least one of IP address, service set identifier (SSID) information, an operating system (OS) name, a device name, RSSI, Tx/Rx Rate information (modulation and coding scheme (MCS)), and SNR.

Meanwhile, the information on the wirelessly-connected terminal information detected by the Wi-Fi AP may be managed by a radio quality detection module.

The proxy device may detect the terminal with low radio quality at step S1720. The proxy device compares the radio condition-related information such as RSSI and MCS with a threshold value to detect radio quality degradation of the terminal.

Next, the proxy device may store a list of the terminals with a low radio quality at step S1730. In detail, the proxy device may include the terminal with the RSSI, SNR, or Tx/Rx rate value less than a predetermined threshold value in the management list for the purpose of management.

Afterward, the proxy device may monitor to detect a new TCP connection at step S1740. If the proxy device detects a new TCP syn packet, the proxy device may determine that a new TCP connection is detected. The proxy device may acquire the IP address of the terminal that has requested for a connection from the syn packet.

Next, the proxy device may determine at step S1750 whether the terminal that has requested for the new connection is a low radio quality terminal. The proxy device may determine whether the IP address of the terminal requested for the new TCP connection is contained in the management list.

If the TCP syn packet is received from the terminal contained in the management list, the proxy device may perform the proxy process on the corresponding connection at step S1760. That is, the proxy device may generate a control message down to a network layer agent to request for passing up the packets for the corresponding terminal to the proxy device.

If the wirelessly-connected terminal moves to a high-quality radio area while the proxy device performs the proxy process on the flow, the proxy process on the corresponding flow is maintained. However, if there is a new incoming flow, the new flow is forwarded on the network layer with no proxy process.

If the TCP syn packet is received from a terminal that is not contained in the management list, a TCP connection may be established between the terminal and the server. Even in such a case, however, the proxy device may return to step S1720 to determine whether the radio quality of the terminal is degraded. If the radio quality of the terminal is degraded, the proxy device may include the corresponding terminal in the management list and perform the proxy process on the old TCP connection. The proxy device may perform the proxy process only on the new flow.

The present disclosure may include an embodiment combining the first and second embodiments. For example, the proxy device may determine whether each of connections established with terminals is a radio connection (first embodiment) and perform the proxy process only on the radio connections with a packet loss rate greater than a threshold value (second embodiment).

Figure 18:
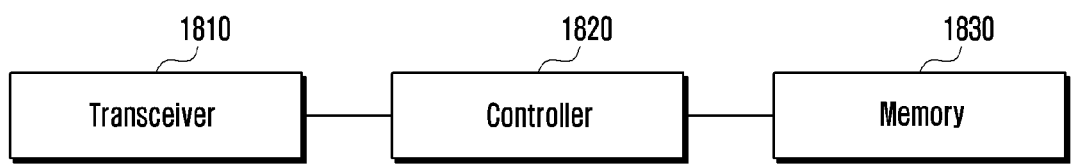
FIG. 18 illustrates a diagram of a configuration of a proxy device according to an embodiment of the present disclosure.

FIG. 18 illustrates a diagram of a configuration of a proxy device according to an embodiment of the present disclosure.

In reference to FIG. 18, the proxy device may include a transceiver 1810, a controller 1820, and a memory 1830. In the present disclosure, the controller may be defined as a circuit, an application-specific integrated circuit, or at least one processor.

The transceiver 1810 may communicate signals with other network entities. For example, the transceiver 1810 may receive packets from a server and transmit the packets to a terminal. The transceiver 1810 may transmit an ACK corresponding to the packet to the server.

The transceiver may receive information such as packet loss rate and sequence number difference value from a radio quality detection module.

The controller 1820 may control overall operations of the proxy device according to the proposed embodiments of the present disclosure. For example, the controller 1820 may control signal flows among the components to accomplish the operations described with reference to the above flowcharts.

In detail, the controller 1820 may receive the packet loss rate information from the radio quality detection module and determine whether to perform the proxy process on the connection of the corresponding terminal based on whether the packet loss rate is greater than a threshold value.

The controller 1820 may also receive the information on the sequence number difference value from the radio quality detection module and determine whether to perform the proxy process on the connection of the corresponding terminal based on whether the sequence number difference value is greater than a threshold value.

The controller 1820 may also receive the information on the radio condition of the terminal and determine whether to perform the proxy process on the connection of the corresponding terminal based on the radio condition information is less than a threshold value.

The controller 1820 may also control other operations of the proxy device proposed in the present disclosure, although detailed descriptions thereof are omitted herein.

The memory 1830 may store at least one of information transmitted/received by the transceiver 1810 and generated by the controller 1820. For example, the memory 1830 may store the information received from the radio quality detection module and the information on the packets received from the server. The memory 1830 may store radio information of the terminal such as IP information, SSID information, OS name, device name, RSSI, Tx/Rx Rate information (MCS) information, and SNR that are received from a Wi-Fi AP.

As described above, the present disclosure is advantageous in terms of improving proxy system performance and minimizing transmission delay by determining whether to split the TCP connection and forward signals without passing the application layer depending on the current system load and whether the TCP connection is a connection using a WLAN.

Also, the present disclosure is advantageous in terms of improving user-experienced network quality by enhancing performance on a wireless link through selective proxying according to the radio condition of the wirelessly connected terminal.

Meanwhile, in the drawings illustrating a method in embodiments, the order of description does not necessarily correspond to the order of execution, and the order relationship may be changed or executed in parallel.

Alternatively, the drawings illustrating the method of the disclosure may omit some of the elements and may include only some of the elements without impairing the essence of the disclosure.

Further, the method of the disclosure may be carried out in combination with some or all of the contents included in each embodiment without departing from the essence of the disclosure.

Although preferred embodiments of the disclosure have been described using specific terms, the specification and drawings are to be regarded in an illustrative rather than a restrictive sense in order to help understand the present disclosure. It will be understood to those skilled in the art that various modifications and changes can be made thereto without departing from the broader spirit and scope of the disclosure.

Although the present disclosure has been described with various embodiments, various changes and modifications may be suggested to one skilled in the art. It is intended that the present disclosure encompass such changes and modifications as fall within the scope of the appended claims.

What is claimed is:

1. A method of a proxy device in a communication system, the method comprising:
    identifying a system load value;
    in case the system load value is smaller than a first predetermined threshold value, identifying whether a connection type between a terminal and the proxy device is a wireless connection;
    in case that the connection type is the wireless connection, proxying a connection between the terminal and a server; and
    in case that the connection type is not the wireless connection, forwarding the connection between the terminal and the server.

2. The method of claim 1,
    wherein proxying the connection between the terminal and the server comprises:
    identifying a packet loss rate on the connection between the terminal and the server;
    identifying whether the packet loss rate is greater than a second predetermined threshold value; and
    in case that the packet loss rate is greater than the second predetermined threshold value, proxying the connection between the terminal and the server.

3. The method of claim 2, wherein identifying the packet loss rate comprises:
    identifying a total number of packets transmitted to the terminal;
    identifying a number of missing packets among the packets transmitted to the terminal; and
    identifying the packet loss rate based on the total number of packets and the number of missing packets.

4. The method of claim 2, wherein identifying the packet loss rate comprises:
calculating a rate of change of a difference between a sequence number of a packet transmitted to the terminal and a sequence number of a packet received from the terminal; and
proxying, if the rate of change of the difference is greater than a predetermined value, the connection between the terminal and the server.

5. The method of claim 4, wherein identifying the packet loss rate further comprises receiving, if the difference is not greater than the predetermined value, other difference-related information.

6. The method of claim 2, wherein identifying the packet loss rate comprises:
calculating an average of differences between sequence numbers of packets transmitted to the terminal and sequence numbers of packets received from the terminal; and
proxying, if the average of the differences is greater than a predetermined value, the connection between the terminal and the server.

7. The method of claim 2, wherein proxying the connection comprises:
transmitting a control message to a network layer of an indoor device;
receiving the packets transmitted by the server through the network layer; and
transmitting an acknowledgement (ACK) packet to the server through the network layer.

8. The method of claim 7, wherein receiving the packets comprises transmitting the packet received from the network layer to the terminal.

9. The method of claim 1, wherein identifying the connection type further comprises:
identifying the connection type based on a Round Trip Time (RTT).

10. The method of claim 1, further comprises:
identifying a retransmission frequency for a predetermined time; and
determining whether to proxy the connection between the terminal and the server based on the identified retransmission frequency.

11. A proxy device of a communication system, the proxy device comprising:
a transceiver; and
a controller configured to:
identify a system load value,
in case the system load value is smaller than a first predetermined threshold value, identify whether a connection type between a terminal and the proxy device is a wireless connection,
perform, in case that the connection type is the wireless connection, a proxy process on a connection between the terminal and a server, and
perform, in case that the connection type is not the wireless connection, a forward process on the connection between the terminal and the server.

12. The proxy device of claim 11, wherein the controller is further configured to:
identify a packet loss rate on the connection between the terminal and the server;
identify whether the packet loss rate is greater than a second predetermined threshold value; and
in case that the packet loss rate is greater than the second predetermined threshold value, perform the proxy process on the connection between the terminal and the server.

13. The proxy device of claim 12, wherein the controller is further configured to:
identify a total number of packets transmitted to the terminal;
identify a number of missing packets among the packets transmitted to the terminal; and
identify the packet loss rate based on the total number of packets and the number of missing packets.

14. The proxy device of claim 12, wherein the controller is further configured to:
calculate a rate of change of a difference between a sequence number of a packet transmitted to the terminal and a sequence number of a packet received from the terminal; and
perform, if the rate of change of the difference is greater than a predetermined value, the proxy process on the connection between the terminal and the server.

15. The proxy device of claim 14, wherein the controller is further configured to receive, if the difference is not greater than the predetermined value, other difference-related information.

16. The proxy device of claim 12, wherein the controller is further configured to:
calculate an average of differences between sequence numbers of packets transmitted to the terminal and sequence numbers of packets received from the terminal; and
perform, if the average of the differences is greater than a predetermined value, the proxy process on the connection between the terminal and the server.

17. The proxy device of claim 12, wherein the controller is further configured to:
transmit a control message to a network layer of an indoor device;
receive the packets transmitted by the server through the network layer; and
transmit an acknowledgement (ACK) packet to the server through the network layer.

18. The proxy device of claim 17, wherein the controller is further configured to transmit the packet received from the network layer to the terminal.

19. The proxy device of claim 11, wherein the connection type is identified base on a Round Trip Time (RTT).

20. The proxy device of claim 11, wherein the controller is further configured to:
identify a retransmission frequency for a predetermined time; and
determine whether to proxy the connection between the terminal and the server based on the identified retransmission frequency.

* * * * *